United States Patent
Bhowmick et al.

(10) Patent No.: US 11,055,492 B2
(45) Date of Patent: Jul. 6, 2021

(54) PRIVATIZED APRIORI ALGORITHM FOR SEQUENTIAL DATA DISCOVERY

(71) Applicant: Apple Inc., Cupertino, CA (US)

(72) Inventors: Abhishek Bhowmick, Santa Clara, CA (US); Ryan M. Rogers, Sunnyvale, CA (US); Umesh S. Vaishampayan, Santa Clara, CA (US); Kartik R. Venkatraman, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 16/271,702

(22) Filed: Feb. 8, 2019

(65) Prior Publication Data

US 2019/0370334 A1 Dec. 5, 2019

Related U.S. Application Data

(60) Provisional application No. 62/679,808, filed on Jun. 2, 2018.

(51) Int. Cl.
*G06F 40/232* (2020.01)
*G06F 40/30* (2020.01)
(Continued)

(52) U.S. Cl.
CPC ............ *G06F 40/30* (2020.01); *G06F 40/232* (2020.01); *G06F 40/242* (2020.01); *G06N 20/00* (2019.01)

(58) Field of Classification Search
CPC .. G06F 21/6254; G06F 40/232; G06F 40/242; G06F 40/279; G06F 21/6227; G06F 21/6245; H04L 9/008
(Continued)

(56) References Cited

U.S. PATENT DOCUMENTS 6,192,360 B1 * 2/2001 Dumais .................. G06F 16/353
9,594,741 B1 3/2017 Thakurta et al.
(Continued)

FOREIGN PATENT DOCUMENTS

CN 101561854 A 10/2009
CN 104050267 B 10/2017
(Continued)

OTHER PUBLICATIONS

Apple: "Learning with Privacy at Scale", Differential Privacy Team, Apple, May 14, 2018, XP055609455, Retrieved from the Internet: https://machinelearning.apple.com/docs/learning-with-privacy-at-scale/appledifferentialprivacysystem.pdf, retrieved on Sep. 17, 2019, 25 pgs.
(Continued)

*Primary Examiner* — Martin Lerner
(74) *Attorney, Agent, or Firm* — Kilpatrick Townsend & Stockton LLP

(57) ABSTRACT

Embodiments described herein provide techniques to encode sequential data in a privacy preserving manner before the data is sent to a sequence learning server. The server can then determine aggregate trends within an overall set of users, without having any specific knowledge about the contributions of individual users. The server can be used to learn new words generated by user client devices in a crowdsourced manner while maintaining local differential privacy of client devices. The server can also learn other sequential data including typed, autocorrected, revised text sequences, sequences of application launches, sequences of purchases on an application store, or other sequences of activities that can be performed on an electronic device.

14 Claims, 22 Drawing Sheets

(51) Int. Cl.
G06N 20/00 (2019.01)
G06F 40/242 (2020.01)

(58) Field of Classification Search
USPC .................. 704/1, 9, 10; 705/50, 51; 706/16
See application file for complete search history.

(56) References Cited

U.S. PATENT DOCUMENTS

| | | | |
|---|---|---|---|
| 9,705,908 B1 | 7/2017 | Thakurta et al. | |
| 10,467,234 B2* | 11/2019 | Nerurkar | G06F 21/6227 |
| 10,489,605 B2* | 11/2019 | Nerurkar | G06F 21/6254 |
| 10,599,867 B2* | 3/2020 | Bhowmick | G06F 21/6245 |
| 10,599,868 B2* | 3/2020 | Barraclough | G06F 21/6245 |
| 10,726,139 B2* | 7/2020 | Bhowmick | G06F 21/6254 |
| 10,776,511 B2* | 9/2020 | Decker | G06F 21/6245 |
| 10,789,363 B1* | 9/2020 | Gursoy | G06F 21/6245 |
| 10,902,149 B2* | 1/2021 | Ding | G06F 21/6245 |
| 2002/0156816 A1* | 10/2002 | Kantrowitz | G06F 40/253 715/256 |
| 2008/0104078 A1* | 5/2008 | Eshghi | G06F 21/6254 |
| 2013/0339751 A1* | 12/2013 | Sun | G06F 21/6254 713/189 |
| 2017/0039211 A1* | 2/2017 | Pottinger | G06F 16/152 |
| 2018/0019866 A1* | 1/2018 | Kerschbaum | G06F 21/6227 |
| 2018/0357446 A1* | 12/2018 | Ferrara | G06F 21/552 |
| 2019/0238516 A1* | 8/2019 | Weggenmann | G06F 40/216 |
| 2020/0082120 A1* | 3/2020 | Richardson | G06F 21/6254 |

FOREIGN PATENT DOCUMENTS

| | | |
|---|---|---|
| CN | 104537025 B | 10/2017 |
| WO | 2017218292 A1 | 12/2017 |
| WO | 2018226297 A1 | 12/2018 |

OTHER PUBLICATIONS

Wang Ning et al: "PrivTrie: Effective Frequent Term Discovery under Local Differential Privacy", 2018 IEEE 34TH International Conference on Data Engineering (ICDE), IEEE, Apr. 16, 2018, 12 pgs.

Jun Tang et al: "Privacy Loss in Apple's Implementation of Differential Privacy on MacOS 10.12", arxiv.org, Cornell University Library, 201 Olin Library Cornell University Ithaca, NY 14853, Sep. 8, 2017, 12 pgs.

Giulia Fanti et al. "Building a RAPPOR with the Unknown: Privacy-Preserving Learning of Associations and Data Dictionaries", Proceedings on Privacy Enhancing Technologies, May 6, 2016, 21 pgs.

Thong T Nguyen et al: "Collecting and Analyzing Data from Smart Device Users with Local Differential Privacy", arxiv.org, Cornell University Library, 201 Olin Library Cornell University Ithaca, NY 14853, Jun. 16, 2016. 11 pgs.

PCT/US2019/031319 "Invitation to Pay Additional Fees and, Where Applicable, Protest Fee" dated Aug. 5, 2019, 15 pgs.

PCT/US2019/031319, "Notification of Transmittal of the International Search Report and the Written Opinion of the International Searching Authority, or the Declaration", dated Jan. 7, 2020, 9 pgs.

Sungwook Kim et al: "Learning New Words From Keystroke Data With Local Ditterential Privacy". IEEE Transactions on Knowledge and Data Engineering, Dec. 7, 2018 (Dec. 7, 2018), XP055609523, Retrieved from the Internet: URL:https://ieeexplore.ieee.org/ielx7/69/4 358933/08568015.

Brendan McMahan H et al: "Learning Differentially Private Language Models Without Losing Accuracy". arxiv.org, Cornell University Library, 201 Olin Library Cornell University Ithaca, NY 14853, Oct. 19, 2017.

Timothy Yang et al: "Applied Federated Learning: Improving Google Keyboard Query Suggestions", arxiv.org, Cornell University Library, 201 Olin Library Cornell University Ithaca, NY 14853, Dec. 7, 2018.

Jia, Ouyang, et al., "An Effective Differential Privacy Transaction Data Publication Strategy", Journal of Computer Research and Development, 2014, pp. 2195-2205 (11 pgs. total), Guangzhou, China.

Bassily, Raef et al., "Practical Locally Private Heavy Hitters", 31st Conf. on Neural Information Processing Systems (NIPS 2017), Long Beach, CA, USA, 9 pgs.

* cited by examiner

Client Data Sequence Matrix 311

$$A'_1 \vec{x} = [1111111111] \begin{bmatrix} 1 \\ 4 \\ 21 \\ 12 \\ 20 \\ 9 \\ 14 \\ 7 \end{bmatrix} = \sum_{i=1}^{8} x_i = 88$$

Client Data Sequence Matrix 313

$$A'_3 \vec{x} = \begin{bmatrix} \sum_{i=1}^{8} x_i = 88 \\ \sum_{i=1}^{7} x_i = 81 \\ \sum_{i=1}^{6} x_i = 67 \end{bmatrix}$$

⋯

Client Data Sequence Matrix 315

$$A'_5 \vec{x} = \begin{bmatrix} \sum_{i=1}^{8} x_i = 88 \\ \sum_{i=1}^{7} x_i = 81 \\ \sum_{i=1}^{6} x_i = 67 \\ \sum_{i=1}^{5} x_i = 58 \\ \sum_{i=1}^{4} x_i = 38 \end{bmatrix}$$

Stacked Matrices 304

$$A'_i = \begin{bmatrix} A'_{i-1} \\ A_i \end{bmatrix}$$

$$A'_k = \begin{bmatrix} 1111 & \cdots & 11 \\ 1111 & \cdots & 10 \\ 1111 & \cdots & 00 \\ \cdots & \cdots & \cdots \\ 1000 & \cdots & 00 \end{bmatrix} \text{Invertible}$$

Candidate Set 530

$$C_8 = \{y_1, y_2, \ldots, y_{10}\}$$

For each $y \in C_8$ there exists an x such that $$A'_k x = y$$

Decoded Data Sequence 535

$$x = (A'_k)^{-1} y \text{ when } k = \ell$$

*FIG. 5B*

Sequential Learning
700

New Word Learning
702

Autocorrect Tuple Learning
704

Activity Sequences
706

PRIVATIZED APRIORI ALGORITHM FOR SEQUENTIAL DATA DISCOVERY

CROSS-REFERENCE

This application claims priority to U.S. Provisional Patent Application No. 62/679,808 filed Jun. 2, 2018, which is hereby incorporated herein by reference.

TECHNICAL FIELD

This disclosure relates generally to client and server electronic devices. More specifically, this disclosure relates to a system and associated methods for privatized learning of sequential data.

BACKGROUND

Where use of a given word is increasing among a user base of an electronic device, it would be advantageous to enable a server to learn such words, for example, to update a user dictionary for the device. However, it would be a violation of the user's privacy to simply send words typed by the user to the server. This scenario also applies for other sequential data that may be performed on a user device. To preserve user privacy, such sequences cannot be simply recorded and set to a server. Instead, any sequential learning should be performed in a manner that preserves the privacy of the users from which data is sourced.

SUMMARY

Embodiments described herein provide techniques to encode sequential data in a privacy preserving manner before the data is sent to a sequence learning server. The server can then determine aggregate trends within an overall set of users, without having any specific knowledge about the contributions of individual users. The server can be used to learn new words generated by user client devices in a crowdsourced manner while maintaining local differential privacy of client devices. The server can also learn other sequential data including typed, autocorrected, revised text sequences, sequences of application launches, sequences of purchases on an application store, or other sequences of activities that can be performed on an electronic device.

One embodiment provides for a method comprising receiving a data sequence and a category from an application, wherein the category is a type of sequence represented by the data sequence, encoding the data sequence into a vector, wherein an encode key for encoding the data sequence varies based on the category of the data sequence, selecting an index uniformly and at random from a set of indices, a size of the set of indices associated with a length of the vector, generating a projected vector based on the vector and a matrix in a set of known matrices, the set of known matrices stored in the client computing device and a sequence learning server, wherein each matrix in the set of known matrices is associated with an index and the projected vector is generated using the matrix associated with a selected index, generating a privatized encoding of the projected vector, and transmitting the privatized encoding, the category, and the selected index to a sequence learning server, the sequence learning server to learn the data sequence in a privacy preserving manner based on aggregate data received from multiple client computing devices.

One embodiment provides for a non-transitory machine-readable medium storing instructions which, when executed by one or more processors of a computing device, cause the computing device to perform operations comprising receiving a tuple including typed, autocorrected, and revised elements, the tuple received from an application executing on the computing device; mapping elements of the tuple into a character sequence; processing the character sequence using a privatization algorithm to generate a privatized sequence of data; and transmitting less than the entire privatized sequence of data to a sequence learning server, the sequence learning server to aggregate data received from multiple client devices to learn frequent tuples of typed, autocorrected, and revised elements.

One embodiment provides for a data processing system on a client computing device, the data processing system comprising a memory to store instructions and one or more processors to execute the instructions. The instructions cause the one or more processors to receive a data sequence and a category from an application, wherein the category is a type of sequence represented by the data sequence, encode the data sequence into an input vector, wherein an encode key for encoding the data sequence varies based on the category, select an index uniformly and at random from a set of indices, a size of the set of indices associated with a length of the input vector, generate a projected vector based on the input vector and a matrix in a set of known matrices, the set of known matrices to be stored on the client computing device and a sequence learning server, wherein each matrix in the set of known matrices is to be associated with an index and the projected vector is to be generated using the matrix associated with a selected index, generate a privatized encoding of the projected vector, and transmit the privatized encoding, the category, and the selected index to a sequence learning server, where the sequence learning server is to learn the data sequence in a privacy preserving manner based on aggregate data received from multiple client computing devices.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

FIG. 3A-3B illustrate elements of the privatized apriori algorithm for sequential data discovery, according to an embodiment.

FIG. 5A-5B illustrate data sequence learning at a sequence learning server, according to an embodiment.

DETAILED DESCRIPTION

Figure 1:
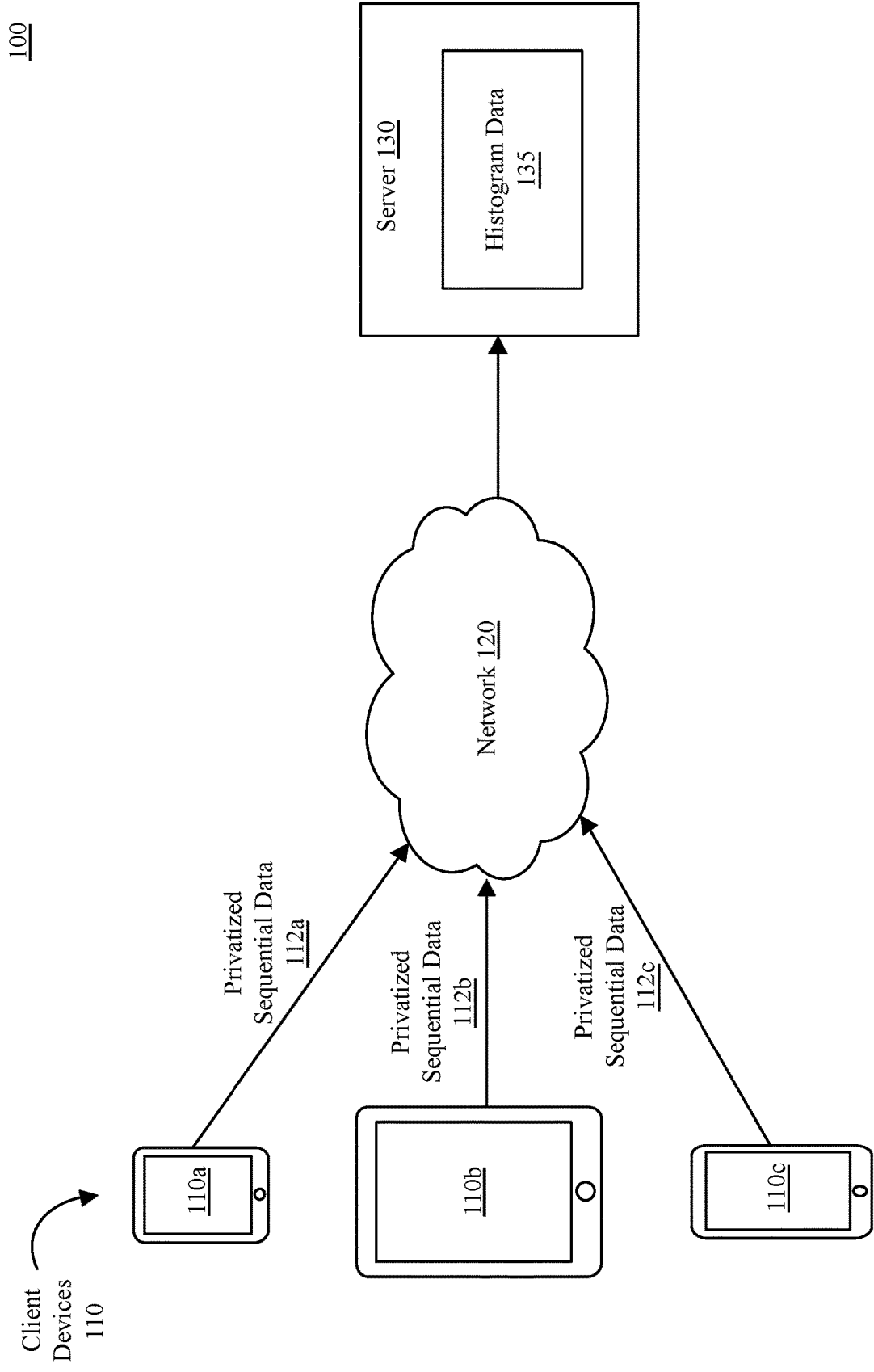
FIG. 1 illustrates a system for learning privatized crowdsourced data sequences from multiple client devices, according to an embodiment.

Embodiments described herein provide techniques to encode sequential data in a privacy preserving manner before the data is sent to a sequence learning server. The server can then determine aggregate trends within an overall set of users, without having any specific knowledge about the contributions of individual users. The server can be used to learn new words generated by user client devices in a crowdsourced manner while maintaining local differential privacy of client devices. The server can also learn other sequential data including typed, autocorrected, revised text sequences, sequences of application launches, sequences of purchases on an application store, or other sequences of activities that can be performed on an electronic device.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod Touch® devices from Apple Computer, Inc. of Cupertino, Calif.

In the discussion that follows, a computing device that includes a touch-sensitive display is described. It should be understood, however, that the computing device may include one or more other physical user-interface devices, such as a separate display, physical keyboard, a mouse, and/or a joystick. Electronic devices described herein support a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

FIG. 1 illustrates a system 100 for learning privatized crowdsourced data sequences from multiple client devices, according to an embodiment. In one embodiment, the system 100 includes a set of client devices 110a-110c (collectively, 110), which can be any of a variety of client devices described herein. The client devices 110 can each generate a corresponding set of privatized sequential data 112a-112c (privatized sequential data 112a from client device 110a, privatized sequential data 112b from client device 110b, privatized sequential data 112c from client device 110c) which each can be transmitted to a sequence learning server 130 via the network 120.

Prior to transmission to the sequence learning server 130 over the network 120, the client devices 110 can privatize samples of sequential data to be sent to the server 130. The sequence learning server 130 can aggregate the privatized sequential data 112a-112c to generate histogram data 135. The histogram data 135 can be used to enable the sequence learning server 130 to learn the various sequences of data. Some embodiments described herein apply a differential privacy encoding to the proposed labels, while other embodiments can implement other privacy techniques, including but not limited to homomorphic encryption, secure multiparty compute, or other privatization techniques.

The client devices 110 described herein can be any one of a variety of electronic devices, including any type of computing device such as a desktop computer, a tablet computer, a smartphone, a smart television or television set top box, a smart home appliance including a smart speaker device, a wearable computing device or computing accessory, or other computing devices such as iPhone®, Apple Watch®, Apple TV®, HomePod™, or similar computing devices.

Figure 2:
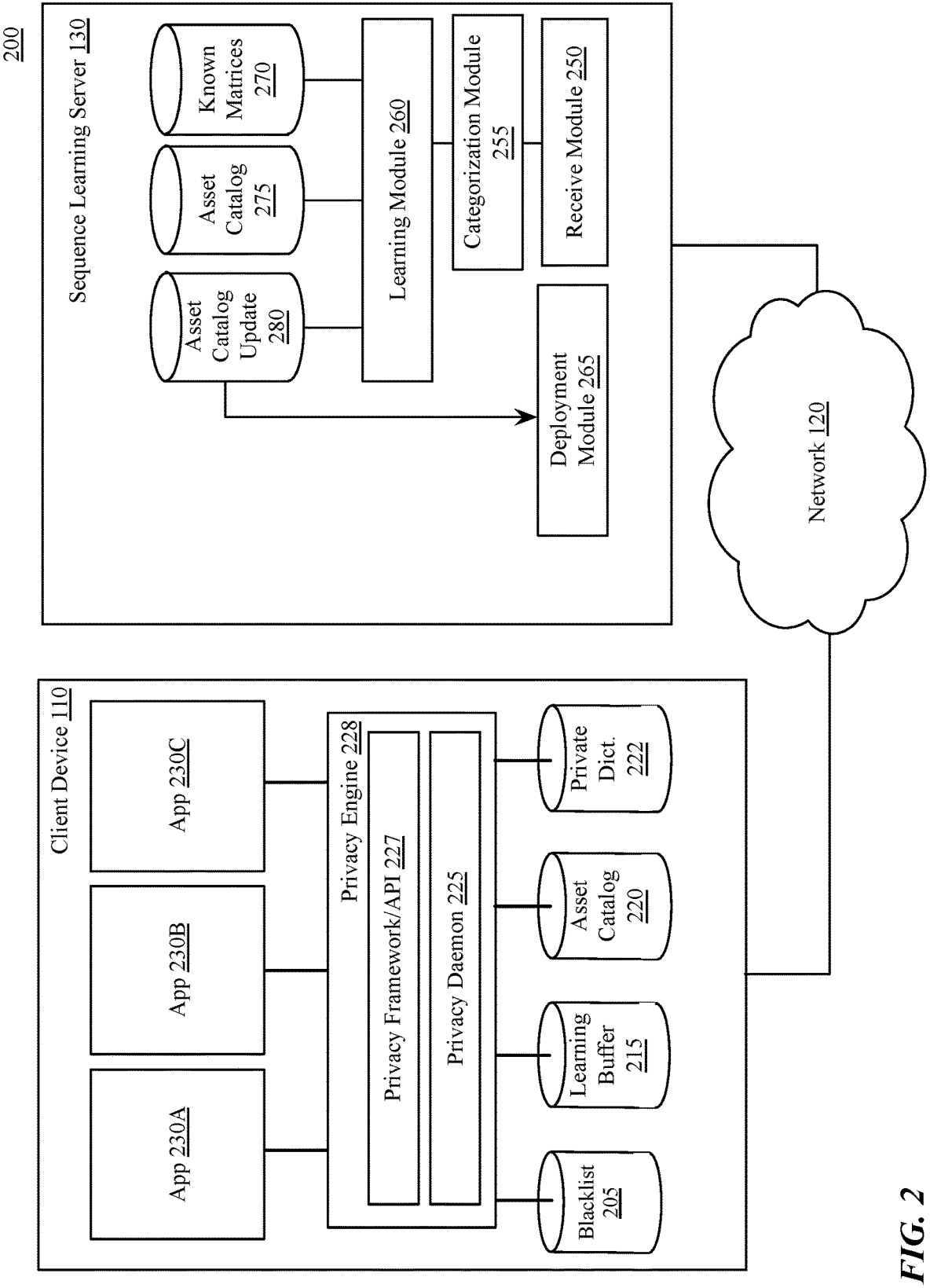
FIG. 2 is a block diagram of a system for learning data sequences based on privatized sequential data, according to an embodiment.

FIG. 2 is a block diagram of a system 200 for learning data sequences based on privatized sequential data, according to an embodiment. The system 200 can include a client device 110 in communication with the sequence learning server 130. In one embodiment, the client device 110 can include a privacy engine 228 that includes a privacy daemon 225 and a privacy framework or application programming interface (API) 227. The privacy daemon 225 can be a system level process that facilitates private data donations. In one embodiment the privacy daemon 225 can administer the privacy budgets for different categories recognized by the categorization module 255. The privacy engine 228 can use various tools, such as hash functions, including cryptographic hash functions, to privatize a data sequence detected by client device 110. The data sequences learned by the system can include, but are not limited to new words used by clients, typed, autocorrected, revised text sequences, sequences of application launches, sequences of purchases on an application store, or other sequences of activities that can be performed on an electronic device.

The client device can additionally include a plurality of storages 205-222. Storages 205-222 can include a blacklist 205, a learning buffer 215, an asset catalog 220, and private dictionary 222. Blacklist 205 can be used to determine words that are not to be sent to the server 130. In one embodiment, a cloud service provider can also add words to the blacklist 205. Furthermore, in one embodiment the blacklist 205 can be used to store words that have been previously transmitted by client device 110 to the sequence learning server 130, but the client device 100 has not yet received an updated asset catalog 280 from the sequence learning server 130 to replace the client device asset catalog 220. In an embodiment, differential privacy engine 228 can check the blacklist storage 205 before processing a word. In an embodiment, privacy engine 228 of a client device 110 sends a word to sequence learning server 130 only once. Once the client receives an updated asset catalog 220, words that appear within blacklist storage 205, that are now contained in the updated asset catalog 220, can be deleted from blacklist storage 205. While the blacklist 205 is described in terms of blacklisted words, other device activity sequences described herein can also be blacklisted.

A term learning buffer 215 can include a storage that holds candidate sequences for transmission to sequence learning server 130. A user may generate more new sequences than can be sent within a privacy budget for a classification of sequences. Thus, the privacy engine 228 can store candidate sequences in term learning buffer 215, then sample the buffer later to determine a random candidate word to send to sequence learning server 130. Term learning buffer 215 can also store sequences that have been sampled from the candidate sequences and selected for transmission to the sequence learning server 130. In an embodiment, sequences are stored in term learning buffer 215 by classification. Each classification can have a privacy budget.

Client device 110 can further include a private dictionary 222 that stores sequences that a user of a client device 110 may want to consider familiar or frequent, i.e., known to the particular client device 110. In an embodiment, the user can designate a word in private dictionary 222 as eligible, or ineligible, for sending to the sequence learning server 130. Differential privacy engine 228 can receive a word from any of application 230A-230C and access the private dictionary 222 to determine whether the word is eligible to be sent to sequence learning server 130. The privacy framework/API 227 can provide an interface for the applications 230A-230C to communicate with the privacy engine 228.

Sequence learning server 130 can include a receive module 250 to receive data, a categorization module 255 to categorize received data according to a classification system, and a learning module 260 to learn new sequences from received privatized data. Sequence learning server 130 can further include one or more storages including storage for known matrices 270, an asset catalog 275, and an updated asset catalog 280. A deployment module to update clients 265 can publish the asset catalog update 280 to one or more client devices 110.

Receive module 250 can asynchronously receive sketches of new sequences for a large plurality of client devices 110 ("crowdsourced data"). Receive module 250 can remove from the received sketch data any latent identifiers, such as IP address, meta data, session identifier, or other data that might identify a particular client device 110 that sent the sketch data.

A categorization module 255 can extract classification data from the privatized sequence and group received sketch data by classification. For example, categorization module 255 can categorize received privatized sequences as words, typed, autocorrected, revised tuples, application activity sequences, or any other sequence that can be learned by the sequence learning server 130. The categorization module 255 can provide the category for the sequence to the learning module 260, which can analyze each category of sequence data separately. In one embodiment, the category for receive data is explicitly stated by the client device 110 to facilitate categorization by the categorization module 255.

The learning module 260 can periodically process the received, privatized sequence data from the plurality of client devices 110. The learning module 260 can include logic to perform operations to accumulate frequencies of received sequences and build histograms using the sequence data. The learning module 260 can then accumulate aggregate sequence data and translate the privatized and encoded sequence data into the original domain of the sequence. Where applicable, an asset catalog 280 can be updated based on the learned sequences. In one embodiment, the learning module 260 can learn each sequence using the privatized apriori algorithm for sequential data discovery described herein. In one embodiment the sequential data discovery algorithm can use the set of known matrices 270, which are known to the sequence learning server 130 as well as the client device 110. For example, a copy of the known matrices 270 can be stored within the privacy framework/API 227.

Figure 3A:
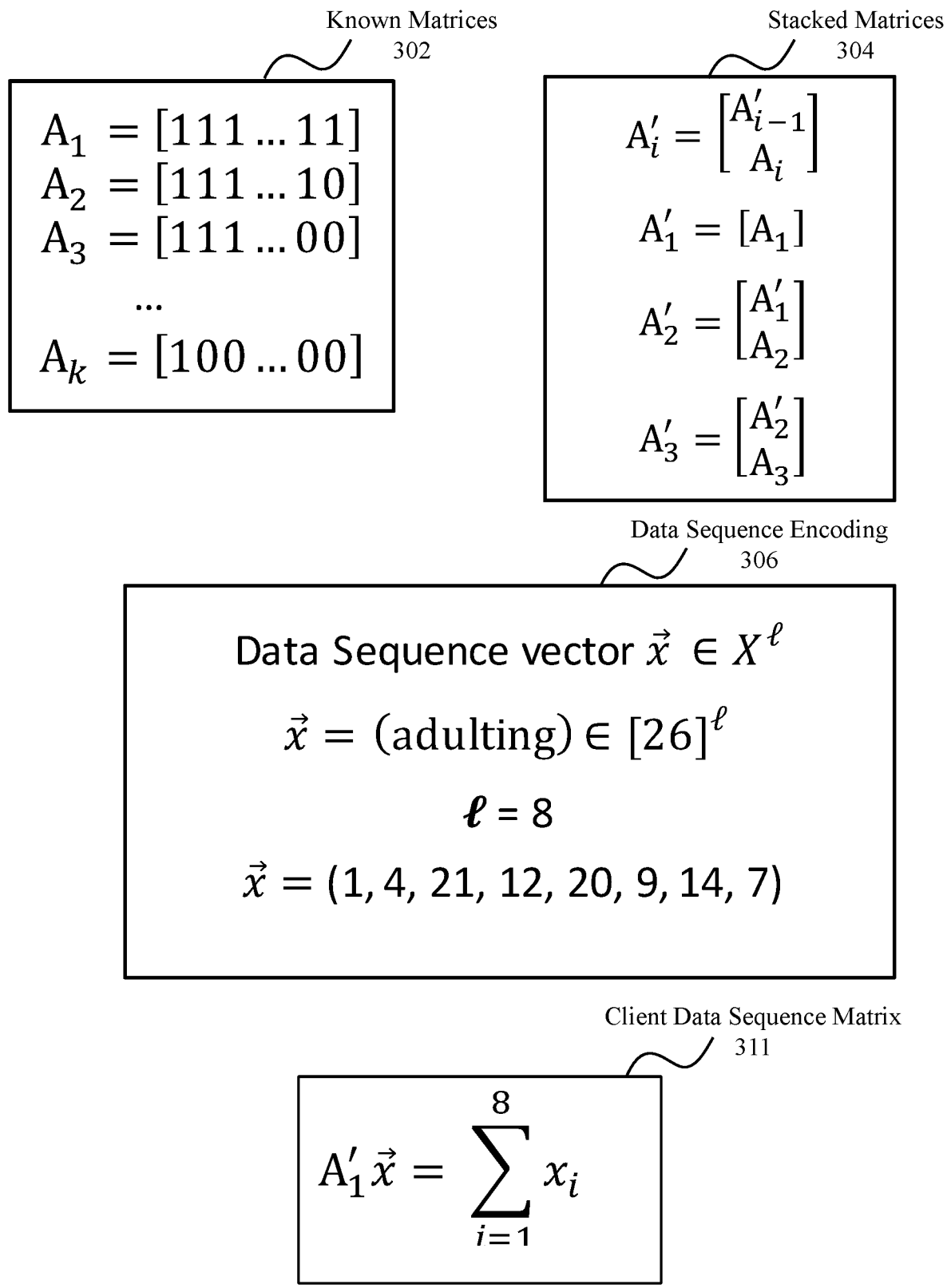

FIG. 3A illustrates elements of the privatized apriori algorithm for sequential data discovery, according to an embodiment. In one embodiment the algorithm makes uses of a set of known matrices 302 that are known by the client and the server. Exemplary known matrices can include k known matrices shown in FIG. 3A, although the specific values of the known matrices can vary. In general, the known matrices 302 can be in the form $A_i \in \mathbb{R}^{1 \times l}$. A set of stacked matrices 304 can be generated that correspond to each of the known matrices 302. In one embodiment, the stacked matrices 304 are also known to the client and the server. The stacked matrices 304 can be in the form:

$$A_i' = \begin{bmatrix} A_{i-1}' \\ A_i \end{bmatrix}$$

The known matrices 302 and the stacked matrices 304, or variants thereof, can be used to encode various types of client sequence data, including new words or activity sequences, which in one embodiment can be transmitted as an encoded tuple. To encode a sequence, a data sequence vector 306 in the form $\vec{x} \in X^{\ell}$ can be generated that translates a sequence to be learned from a base domain into a sequential data value. For example, to learn a new word "adulting" the word is translated into a vector, where the exemplary vector as eight elements ($\ell = 8$). The eight element vector is constructed using a domain $[26]^{\ell}$ based on 26 letters of the English alphabet. To learn words of other languages, a different encoding domain can be used that corresponds to the number of characters or figures in the language. In this example, the word "adulting" can be translated into vector $\vec{x} = (1, 4, 21, 12, 20, 9, 14, 7)$. The vector can be encoded into a client sequence matrix 311 using the stacked matrices 304 in the form:

$$A_i \vec{x} = \sum_{j=1}^{\ell-(i-1)} x_j$$

For example, FIG. 3B shows an expanded view of client sequence 311, which is calculated with i=1. For a given client device, one client sequence matrix 311 is generated and privatized using a privatization algorithm, such as the count mean sketch differential privacy algorithm. The specific client sequence 311 that is generated can be selected by selecting an i uniformly and at random from [1, 2, . . . , k]. The selected i can be used to generate a projected vector x in the form Exemplary client sequence matrices include client data sequence matrix 313 for i=3 and client data sequence matrix 315 for i=5. The generated client data sequence matrix can be privatized via the application of a privacy algorithm, such as the count mean sketch differential privacy algorithm, which is described in greater detail below. The privatized matrix can then be transmitted to the sequence learning server 130 along with the selected i. The privatized data can then be aggregated across multiple client devices to generate a set of k histograms, one histogram for each selected i.

Figure 4:
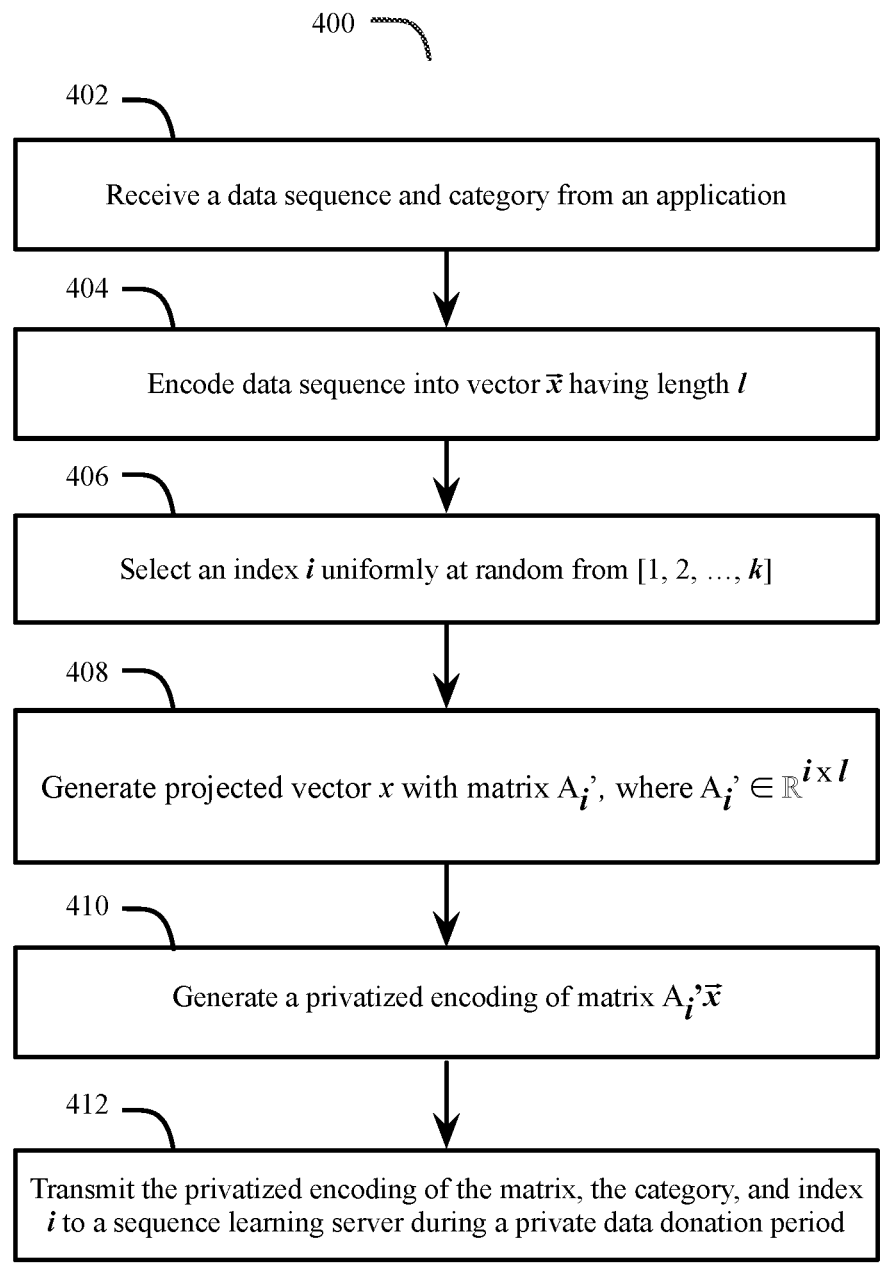
FIG. 4 illustrates a method to encode and transmit a portion of a privatized data sequence data to a term learning server, according to an embodiment.

FIG. 4 illustrates a method 400 to encode and transmit a portion of a privatized data sequence data to a term learning server, according to an embodiment. The method 400 can be implemented by software instructions executing on one or more processor devices described herein.

In one embodiment, method 400 includes to receive a data sequence and category from an application, as shown at block 402. The category can identify the type of data sequence, such as whether the sequence is a new word or a sequence tuple. Method 400 additionally includes to encode data sequence into vector $\vec{x}$ having length l, as shown at block 404. At block 406, method 400 includes to select an index i uniformly at random from [1, 2, . . . , k]. At block 408, method 400 additionally includes to generate projected vector x with matrix $A_i'$, where $A_i' \in \mathbb{R}^{i \times l}$.

At block 410, method 400 can generate a privatized encoding of matrix $A_1'\vec{x}$. At block 412, method 400 can transmit the privatized encoding of the matrix, the category, and index i to a sequence learning server during a private data donation period for the electronic device, where the electronic device adheres to a private data donation budget that limits the rate at which the device can donate privatized data.

Figure 5A:
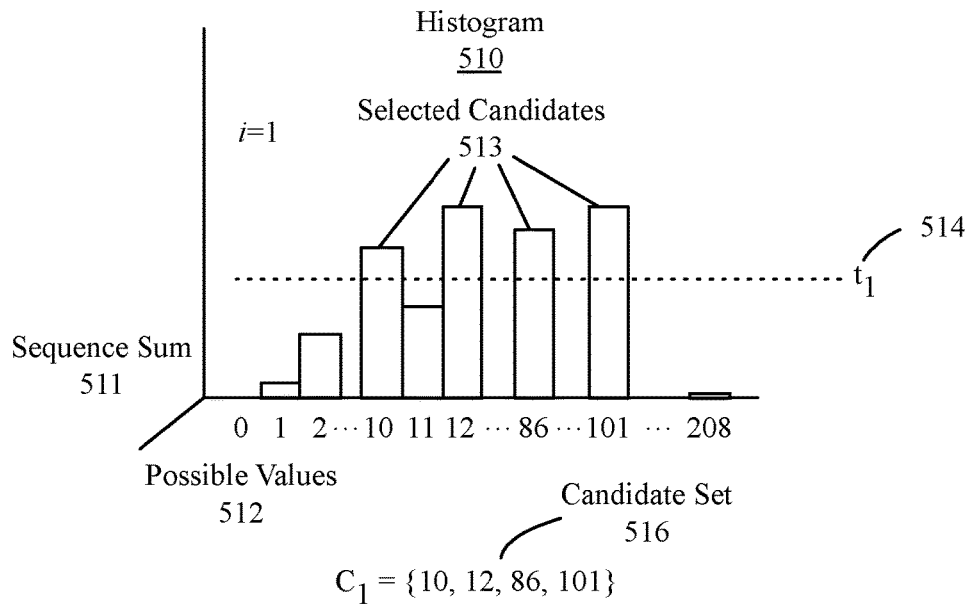
Figure 5A:
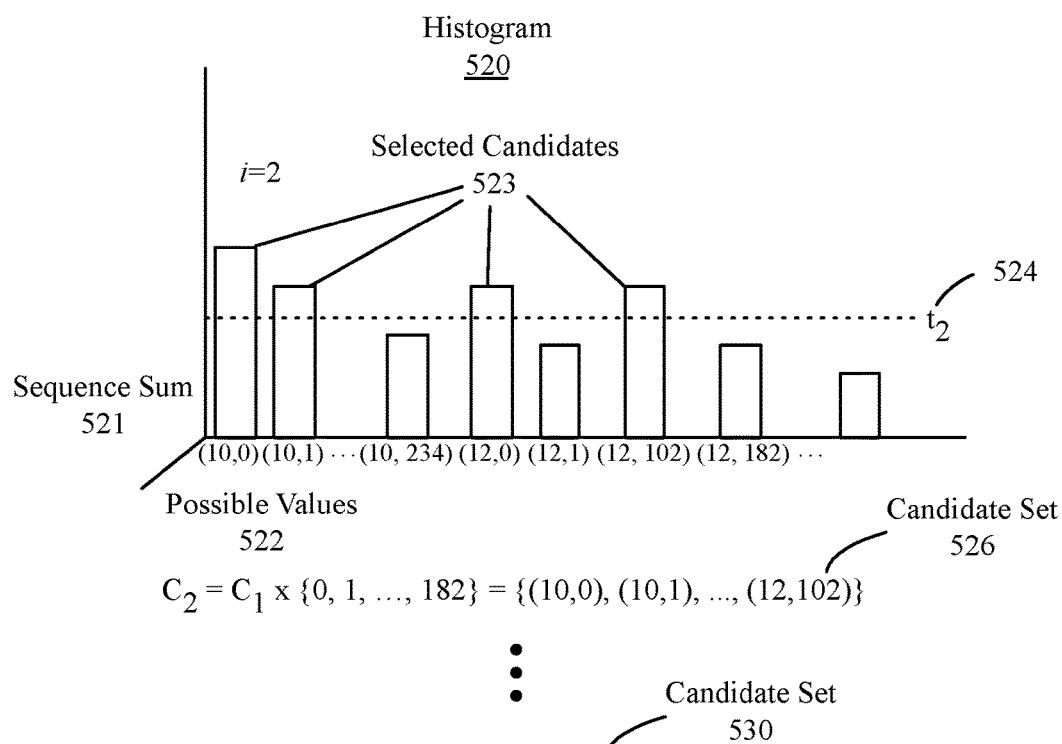

FIG. 5A-5B illustrate data sequence learning at a sequence learning server, according to an embodiment. FIG. 5A illustrates exemplary histograms and selected candidates above a given threshold for the histogram. FIG. 5B illustrates the mapping of a candidate set back to an origin domain. The specific numerical values, vectors, and vector lengths illustrates in FIG. 5A-5B are exemplary and not limiting as to any specific embodiment.

As shown in FIG. 5A, a first histogram 510 can be constructed that lists each sequence sum 511 received from the set of client devices configured to send privatized samples of sequence data. Only one sample will be received from a given client device. Additionally, not all client devices may send samples. When a sequence sum value is received matching one of the possible values 512, the sequence sum for the value can be incremented by one. Thus, histogram 510 can generate a frequency count for each of the possible values in a given domain. The sequence sums 511 can be analyzed in the context of each possible value that can be received for a given coordinate. Histogram 510 tracks sums for index i=1 and the donated data is a vector of length 8 for a new word. Thus, the maximum number of the possible values 512 is based on the vector (z, z, z, z, z, z, z, z), which translates to (26, 26, 26, 26, 26, 26, 26, 26), which has a sequence sum of 26×8=208.

The selected candidates 513 include candidates over threshold value 514 for the histogram (e.g., $t_1$ for histogram 510). The selected candidates 513 can be used to generate a candidate set 516 ($C_1$). The candidate set 516 can then form the basis of a subsequent histogram 520 for i=2. Sequence sum 521 of histogram 520 is a count of a frequency at which each of the possible values 522 is received from the set of client devices, where the possible values are generated based on the candidate set 516 times a vector containing the set of possible values {0, 1, . . . , 182}. A resulting candidate set 526 ($C_2$) can be generated based on histogram 520.

Successive histograms can be generated until a candidate set 530 is generated. An exemplary candidate set 530 is illustrated, where exemplary candidate set 530 $C_8=\{y_1, y_2, \ldots, y_{10}\}$, where the candidate set has 10 exemplary data vectors $y_1$ through $y_{10}$, for each $y \in C_8$, there exists an x such that $A'_k x = y$.

As shown in FIG. 5B, for each $y_1$ through exemplary $y_{10}$ (the specific number of values can vary) a decoded data sequence 535 can be computed, where decoded data sequence x is $x=(A'_k)^{-1}y$ when $k=\ell$. When solving for x, under some conditions it may be the case that candidate x is not in $[26]^\ell$, thus cannot be decoded to legitimate word. Under such conditions, only decoded candidates x that are in $[26]^\ell$ are considered. The decoded data sequence 535 can be solved using an inversion of the stacked matrices 304, which are known to the server. Once the new word is decoded, the word can be added to a set of known sequences and an asset catalog associated with the sequence can be updated. While learning a new word (e.g., a character sequence) is illustrated, the illustrated client-side and server-side algorithms can be used to learn any encodable sequence, where other sequences can be encoded into tuples that can be decoded and learned by the server.

Figure 6:
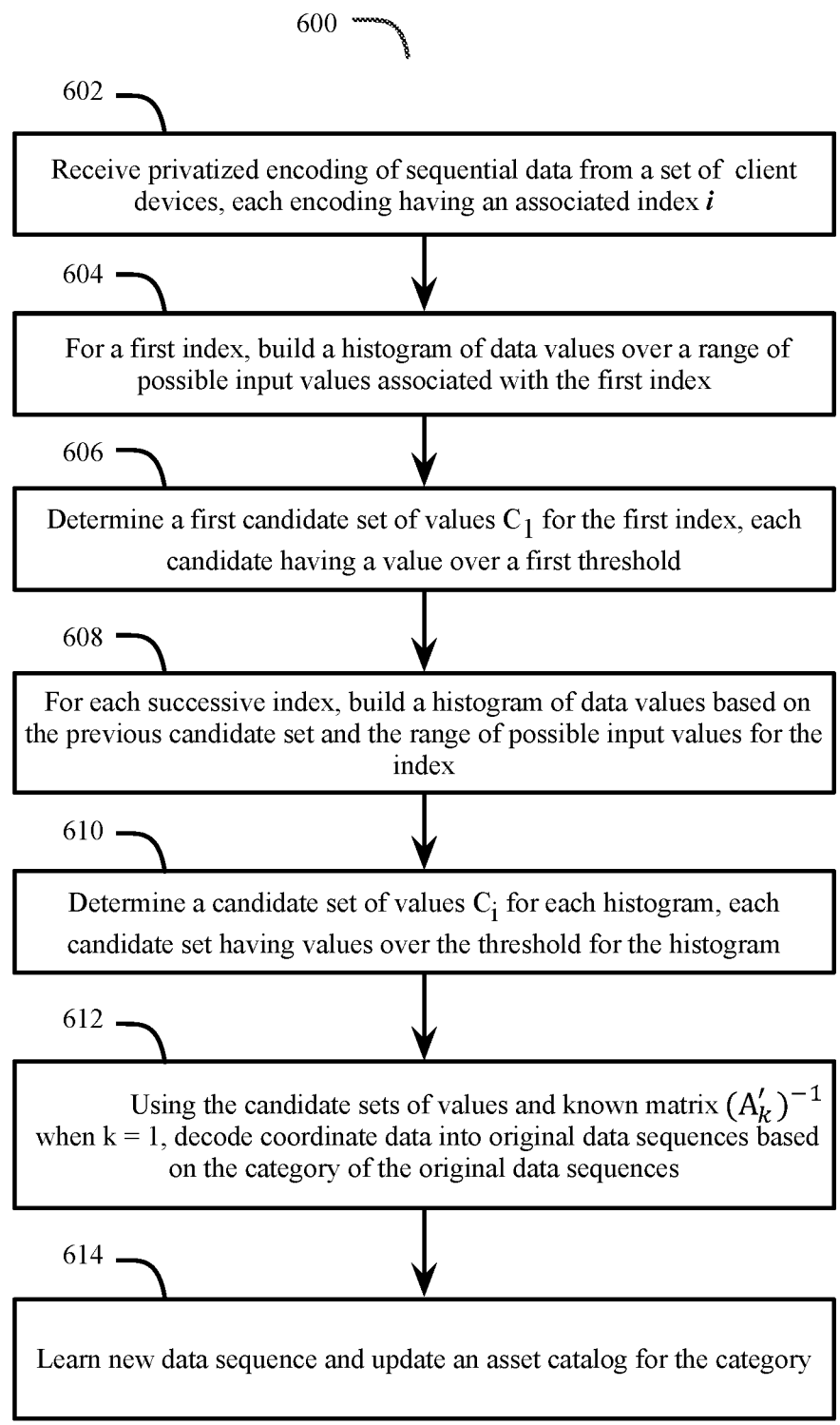
FIG. 6 is a flow diagram for a method to enable a server to learn a new sequence of data while preserving client privacy.

FIG. 6 is a flow diagram for a method 600 to enable a server to learn a new sequence of data while preserving client privacy. Method 600 can be implemented by a server device described herein, such as the sequence learning server 130. Aspects of method 600 are shown in FIG. 5A-5B.

In one embodiment, method 600 includes to receive privatized encoding of sequential data from a set of client devices, each encoding having an associated index i, as shown at block 602. Method 600 additionally includes, for a first index, to build a histogram of data values over a range of possible input values associated with the first index, as shown at block 604. Method 600 additionally includes to determine a first candidate set of values $C_1$ for the first index, each candidate having a value over a first threshold, as shown at block 606. Method 600 further includes, as shown at block 608, for each successive index, to build a histogram of data values based on the previous candidate set and the range of possible input values for the index.

In one embodiment, method 600 additionally includes to determine a candidate set of values $C_1$ for each histogram, each candidate set having values over the threshold for the histogram, as shown at block 610. Each histogram can have a different threshold value. Furthermore, method 600 additionally includes, using the candidate sets of values and known matrix $(A'_k)^{-1}$ when $k=\ell$, to decode coordinate data into original data sequences based on the category of the original data sequences, as shown at block 612.

As shown a block 614 method 600 includes for the sequence learning server to learn the new data sequence and update an asset catalog for the category based on the newly learned sequence.

Figure 7:
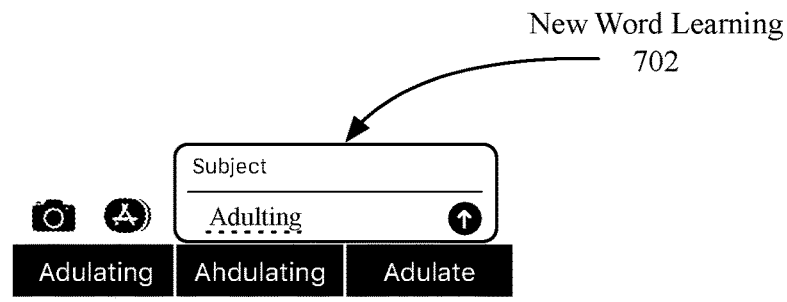
FIG. 7 illustrates sequential learning for the various types of data sequences that can be learned using systems and methods described herein.
Figure 7:
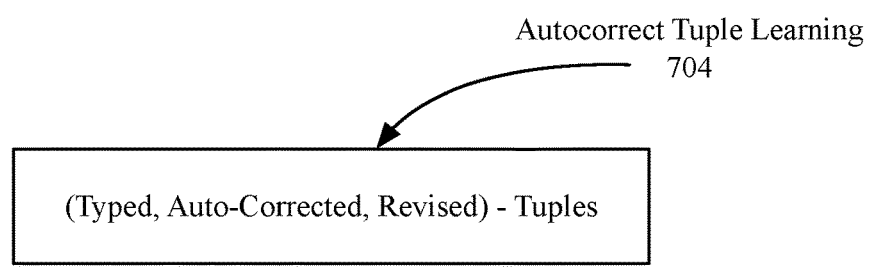
Figure 7:
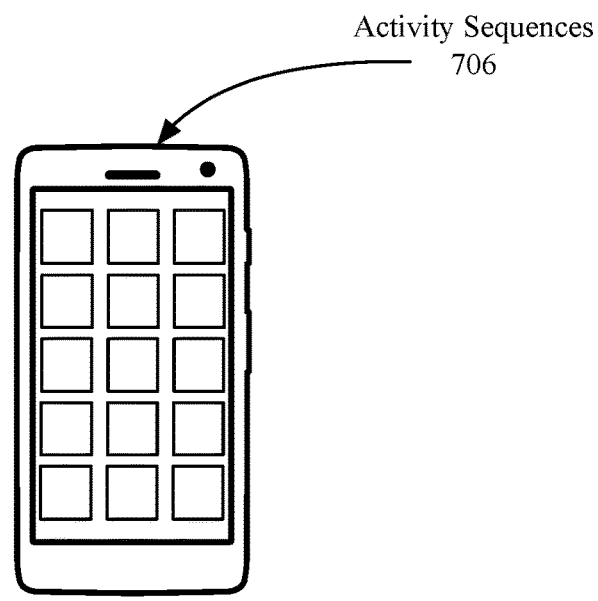

FIG. 7 illustrates sequential learning 700 for the various types of data sequences that can be learned using systems and methods described herein. A privacy engine 228 on a client device 110, for example, as in system 200 in FIG. 2, can receive data sequences from various sources and can learn data sequences using a generalized algorithm by translating the various sequences into a numerical sequence. For example, new word learning 702 can be performed by translating a word that is not in a known dictionary into a numerical sequence. In one embodiment, autocorrect tuple learning 704 can also be performed by encoding a (typed, auto-corrected, revised) tuple into a numerical sequence. Furthermore, generic activity sequences 706 can be encoded, such as but not limited to application launch sequences and application activity sequences.

Figure 8:
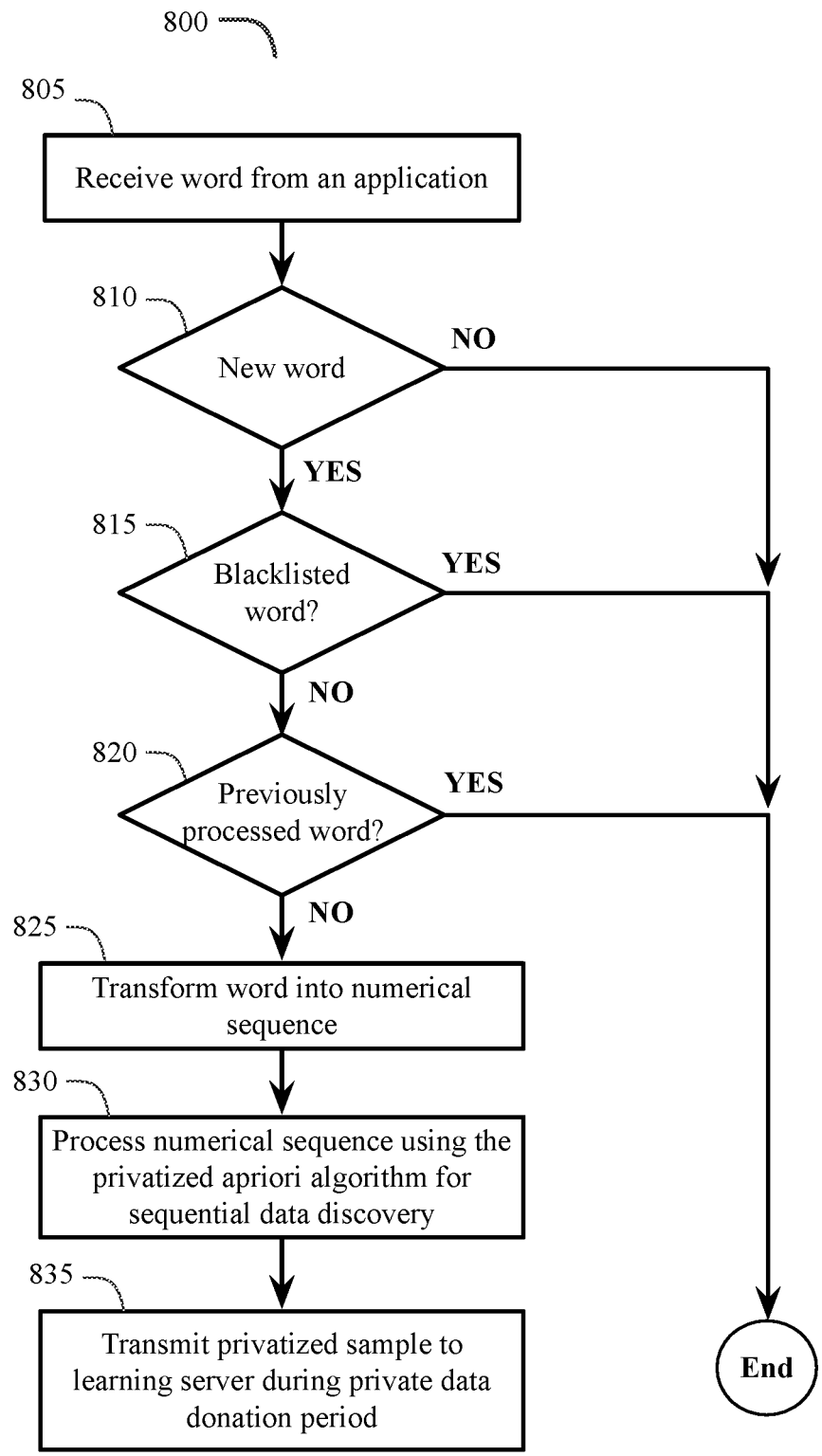
FIG. 8 is a flow diagram for a method to transmit a new word sequence from a client device, according to an embodiment.

FIG. 8 is a flow diagram for a method 800 to transmit a new word sequence from a client device, according to an embodiment. Method 800 can be used to enable new word learning 702 as in FIG. 7. In operation 805, a privacy engine 228 as in FIG. 2 can receive a new word from any of application 230A-230C. For example, application 230B can identify a new word by comparing the new word to dictionaries included on the client device 110. If a word is not included in the dictionaries, then application 230B can determined that the new word is to be sent to the privacy engine 228. Any of applications 230A-230C can be an email application, a messaging application, a word processing application, a web browser, a client device browser, an online store, or any other application.

In operation 810, privacy engine 228 can access asset catalog 220 to determine whether the word received in operation 805 is already known to sequence learning server 130, as evidenced by the presence of the word in asset catalog 220 or private dictionary 222. If the word is in the asset catalog 220 or in the private dictionary 222, then the method 800 ends. Otherwise the method 800 continues at operation 815.

In operation 815, any of application 230A-230C or privacy engine 228 can determine whether the word is stored in blacklist storage 205. If the word is stored in blacklist storage 205 then method 800 ends. Otherwise, method 800 resumes at operation 820.

In operation 820, privacy engine 228 can determine whether the word has been previously processed. A previously processed word can include a term that has been previously transmitted to sequence learning server 130 by this client device 110 but is not yet found in an updated asset catalog 220 on the client device 110. A word that has been previously processed can also be a word that is stored in the learning buffer 215 that has not yet been transmitted to sequence learning server 130, but has been processed by privacy engine 228 on client device 110. If the word has been previously processed, then the method 800 ends. Otherwise, method 800 resumes at operation 825.

In operation 825, the privacy engine 228 can transform the word into a numerical sequence as described herein. The privacy engine can then process the numerical sequence using the privatized apriori algorithm for sequential data discovery in operation 830. After operation 830, method 800 includes operation 835, in which the privacy engine 228 can transmit a privatized sample to learning server during private data donation period.

In embodiment, a word is selected at random in accordance with a policy. This process slows the rate at which new words are sent to the sequence learning server 130 and extends the life of the privacy budget. In an embodiment, privacy engine 228 can contain logic that determines when a privacy budget for a classification is depleted. Privacy engine 228 can then monitor the elapsed time before the privacy budget is replenished. The time interval between client intervals of processing can be extended or contracted, based upon the amount of privacy budget available at any time.

Figure 9:
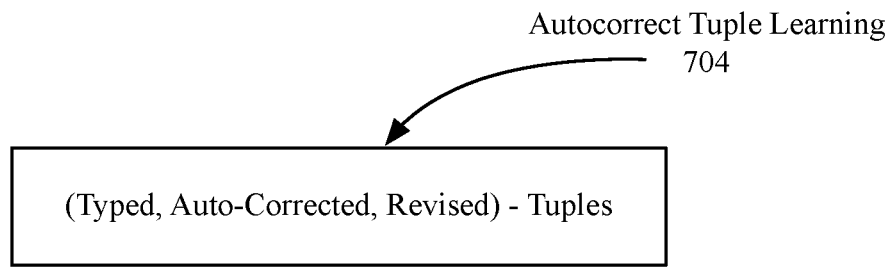
FIG. 9 illustrates autocorrect tuple learning, according to an embodiment.
Figure 9:
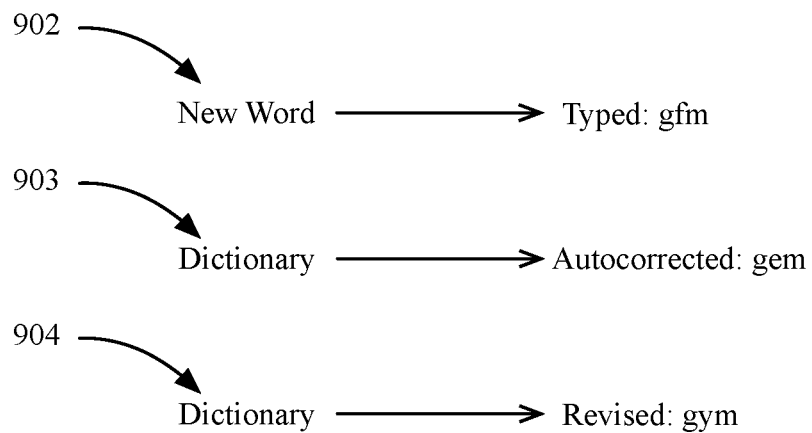
Figure 9:
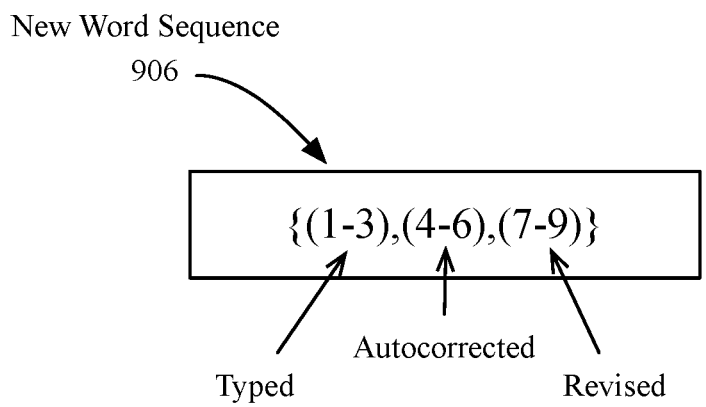

FIG. 9 illustrates autocorrect tuple learning, 704, according to an embodiment. In one embodiment, a keyboard autocorrect algorithm can be evaluated by gathering data on the most frequent combination of typed, autocorrected, and revised words. For example, a user can use a keyboard application to type a new word 902 (e.g., gfm). The typed word can be autocorrected to a dictionary word 903 (e.g., gem) using an autocorrect algorithm. If the autocorrected word is not the word intended to be typed, a user of the software keyboard can revise the word to what will likely be a second dictionary word 904 (e.g., gym). It can be valuable for a sequence learning server 130 to be able to learn such autocorrect tuples in a privacy preserving manner, for example, to enable revised keyboard layouts or revisions to autocorrect algorithms.

In one embodiment, the privatized apriori algorithm for sequential data discovery described herein that can be used to enable the sequence learning server 130 to learn new word sequences can be leveraged to enable privatized autocorrect tuple learning. The typed, autocorrected, and revised tuple sequence can be encoded into a new word sequence 906. The typed word can be encoded into a first block of characters, the autocorrected word can be encoded into a second block of characters, while the revised word can be encoded into a third block of characters. Depending on the size of the new word sequence 906, the number of characters per word may be limited, as multiple words will be sent within a single sequential value. The privatized apriori algorithm for sequential data discovery can then be used to enable privacy preserving transmissions of selected portions of the combined sequence. A domain of common sequences can then be constructed on the learning server using the aggregated user data. As the domain is known for the autocorrected and revised words, the server can more readily determine the second and third words within the tuple, in comparison to the server approach that applied when learning new words.

Figure 10:
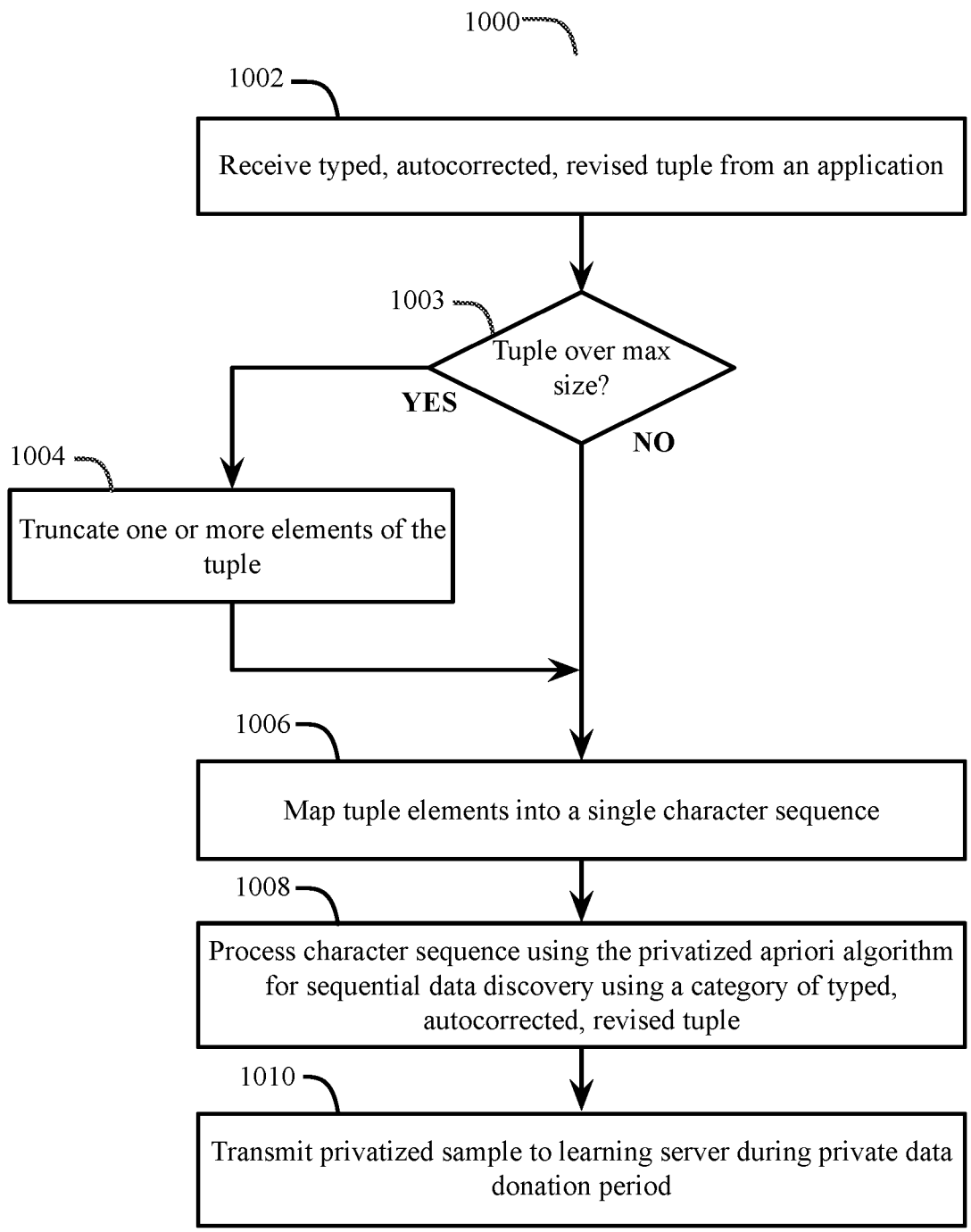
FIG. 10 illustrates a method to transmit a portion of a typed, autocorrected, and revised tuple in a privacy preserving manner, according to an embodiment.

FIG. 10 illustrates a method 1000 to transmit a portion of a typed, autocorrected, and revised tuple in a privacy preserving manner, according to an embodiment. In one embodiment, method 1000 includes for a privacy engine 228 to perform operation 1002 to receive a typed, autocorrected, revised tuple from an application on a computing device (e.g., application 230A-230C). The application can be a keyboard application or another application including an autocorrect algorithm. To encode the tuple into a new word sequence, a maximum size for the tuple may be imposed. The privacy engine 228 can perform operation 1003 to determine that the tuple is over a maximum size, method 1000 includes to truncate one or more elements of the tuple, as shown at block 1004. In one embodiment, the maximum size is defined as a maximum number of characters that can be mapped into a single character sequence.

The privacy engine 228 can then perform operation 1006 to map tuple elements into a single character sequence. Method 1000 additionally includes for the privacy engine 228 to perform operation 1008 to process character sequence using the privatized apriori algorithm for sequential data discovery using a category of typed, autocorrected, revised tuple. Method 1000 can then include for the privacy engine 228 to perform operation 1010 to transmit a privatized sample to learning server during private (e.g., privatized) data donation period.

In one embodiment, the individual elements within the typed, autocorrected, and revised tuples can be sampled randomly. If an autocorrected or revised element is selected, the selected element can be sent to a server in a privacy preserving manner using a differential privacy algorithm, such as the count-mean-sketch algorithm. A privacy algorithm, such as a differential privacy algorithm, can be used in this case because the autocorrected word, and likely the revised word, will be in a universe of dictionary words that are known to the learning server and the client device. If the randomly selected element is the typed word, the privatized apriori algorithm for sequential data discovery described herein can be used with an associated category that indicates the sampled element is a typed word from a specific (typed, autocorrected, revised) tuple.

Figure 11:
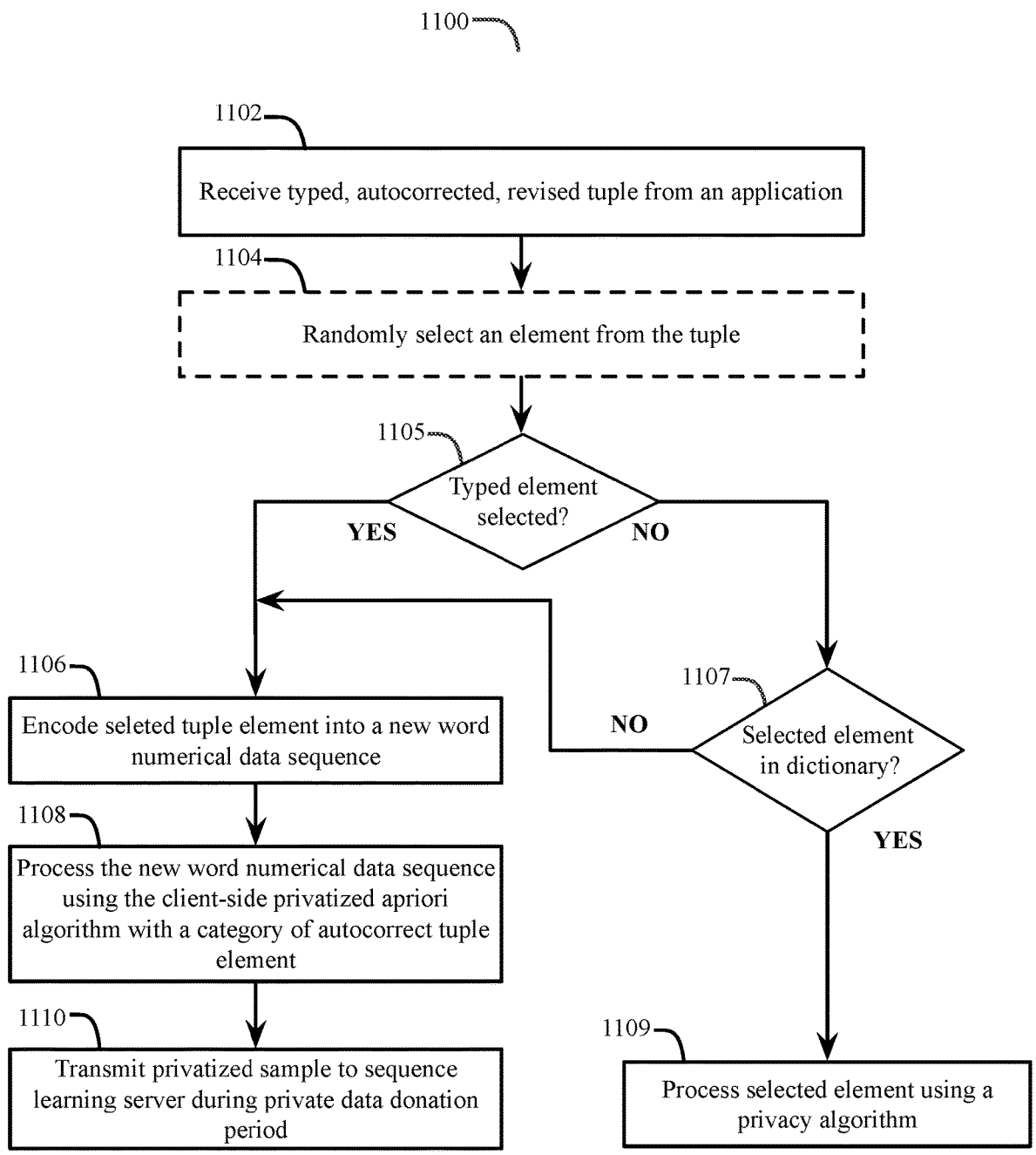
FIG. 11 illustrates a method to transmit a portion of a typed, autocorrected, and revised tuple in a privacy preserving manner, according to an embodiment.

FIG. 11 illustrates a method 1100 to transmit a portion of a typed, autocorrected, and revised tuple in a privacy preserving manner, according to an embodiment. In one embodiment, method 1100 includes for a privacy engine 228 to perform operation 1102 to receive a typed, autocorrected, revised tuple from an application on a computing device (e.g., application 230A-230C). The application can be a keyboard application or another application including an autocorrect algorithm. Method 1100 optionally includes for the privacy engine 228 to perform an operation 1104 to randomly select an element from the tuple. For a randomly selected element, method 1100 includes for the privacy engine 228 additionally to perform an operation 1105 to determine if the randomly selected element is the typed element of the (typed, autocorrected, revised) tuple. Alternatively, method 1100 can optionally always select the typed element to transmit.

The donating application will autocorrect a typed word if the word does not appear in the asset catalog 220 or the private dictionary 222. To learn a new typed word, method 1100 includes for the privacy engine 228 to perform operation 1106 to encode a selected tuple element into a new word numerical data sequence. The mapping between the tuple elements and the new word numerical sequence can be a fixed mapped, or the mapping can be transmitted as metadata to the sequence learning server. Method 1100 additionally includes for the privacy engine 228 to perform operation 1108 to process the new word numerical data sequence using the client side privatized apriori algorithm with a category of autocorrect tuple element. Method 1100 further includes operation 1110, in which the privacy engine 228 transmits a privatized sample to the sequence learning server 130 during a private (e.g., privatized) data donation period for the client device 110. The rate of private or privatized data that can be transmitted can be limited, in some embodiments, according to a privacy budget associated with the client device 110.

If method 1100 includes operation 1104 to randomly select an element from the tuple, and the typed element is not selected at operation 1105, method 1100 includes for the privacy engine 228 to perform an operation 1107 to determine if the selected element is in a dictionary known by the client 110 and the sequence learning server 130, such as, for example, the asset catalog 220. If the selected element is not in the dictionary, for example, if the selected element is the revised element and the revised element is not in a dictionary known to the sequence learning server 130, the element can be encoded into a new word numerical data sequence via operation 1106. If the selected element is in a dictionary known to the sequence learning server 130, for example, if the selected element is the autocorrected element or a revised element within a dictionary, method 1100 can perform operation 1109 to process the selected element using a privacy algorithm, such as, but not limited to the count mean sketch differential privacy algorithm.

Figure 12:
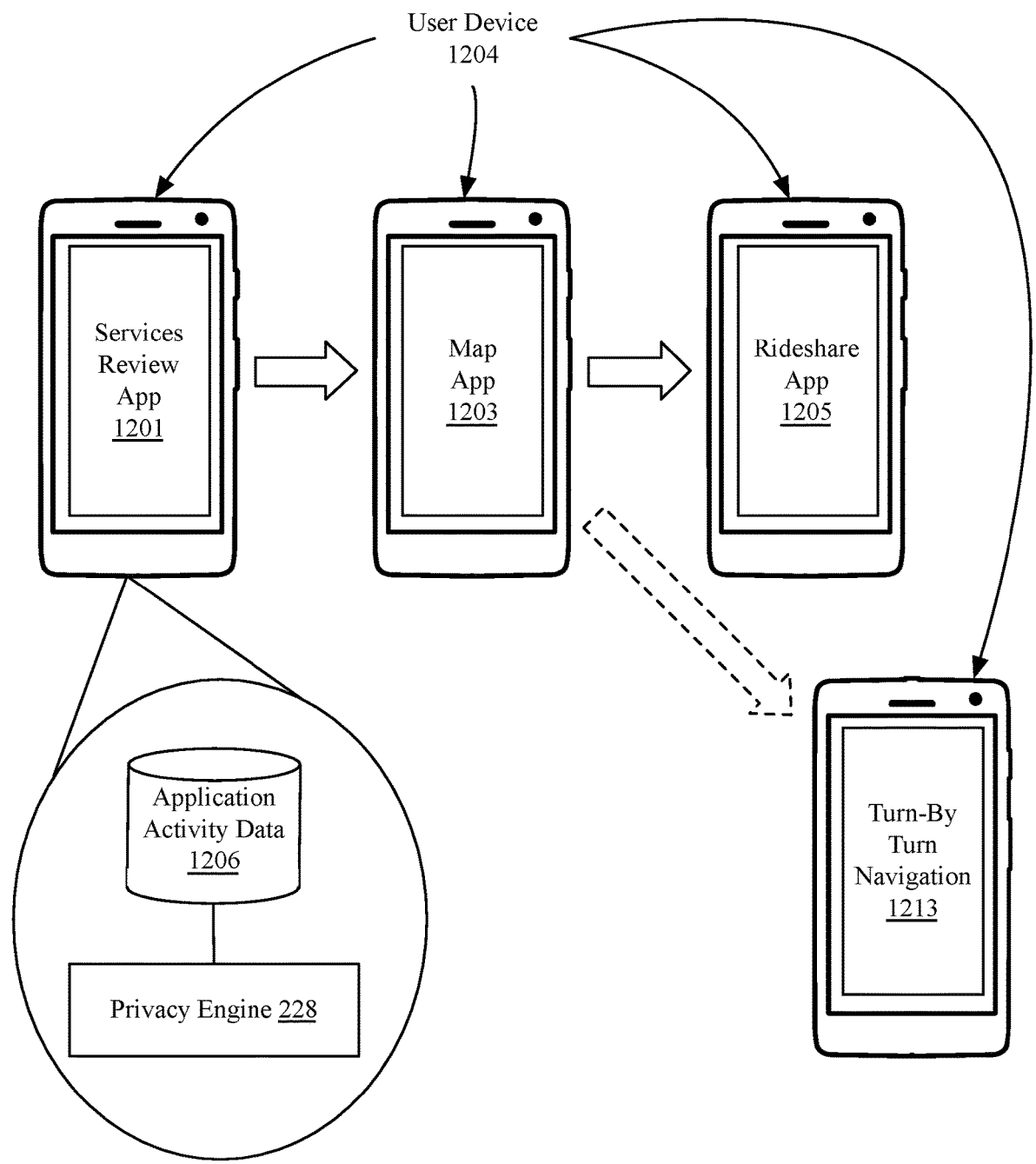
FIG. 12 illustrates device activity sequences that can be learned in a privatized manner, according to an embodiment.

FIG. 12 illustrates device activity sequences that can be learned in a privatized manner, according to an embodiment. A user device 1204 is illustrated, where the user device 1204 can be a variant of any form of user device described herein, including any of the client devices 110 described herein. The user device 1204 can execute a variety of functions on behalf of a user, including functions performed by one or more applications executing on the user device 1204. In one embodiment, application activity data 1206 can be stored by the user device 1204 that records at least a subset of application launches or in-app activities. Applications and activities within the application activity data 1206 can be assigned numerical values. The numerical values associated with the applications and activities performed by the user device 1204 can be encoded as sequential data and a subset of that sequential data can be privatized and transmitted to the sequence learning server 130 by the privacy engine 228.

In one embodiment the launching of the services review application 1201 can be detected and stored in the application activity data 1206. In one embodiment the user device 1204 can store at least a subset of in-app activity within the application activity data 1206. For example, the services review application 1201 can optionally donate in-application activity to the application activity data 1206 and/or searches performed within the services review application 1201. In one embodiment, the user device 1204 can detect a subset of in-app activity performed on the user device 1204. In one embodiment, application activity data 1206 that is stored on a user device 1204 can be privatized by the privacy engine 228 and stored in a privatized manner until the privatized data can be transmitted to the sequence learning server 130 during a private donation period of the user device 1204.

As an example of the activities described above, a user can launch a services review application 1201 that provides user reviews of service or goods providers (e.g., restaurants, retail stores, repair shops, etc.). The user device 1204 can launch the services review application 1201 in response to receipt of a graphical interface request or a virtual assistant request. The user can perform a search for a service or goods provider, for example via the graphical interface or voice interface of the user device 1204. The user device 1204 can then display reviews of one or more providers. The user can then launch a map application 1203 on the user device, for example, to enable the user to determine a location of one or more service or goods providers. The user can then launch a rideshare application 1205 on the user device 1204. The rideshare application 1205, can be separate from or associated with the map application 1203. Alternatively, the user can direct the user device 1204 to enable turn-by-navigation 1213, which can be a feature of the map application 1203 or a feature provided by a separate map or navigation application. In one embodiment, each of the application launches and/or application activities can be encoded as a numerical sequence within the application activity data 1206. The numerical sequence can be privatized by the privacy engine 228 for storage. A subset of the privatized application activity data can be transmitted to a sequence learning server. The privatization of the sequential data can be performed via the privatized apriori algorithm for sequential data discovery described herein.

Embodiments are not limited to the specific examples shown in FIG. 12. Additional application activity sequences that can be learned include purchase sequences within an online application or media store (e.g., app store) or in-app purchase sequences within an application. In embodiments described herein, only a subset of privatized sequences are transmitted. The learning server can learn the most prominent sequences via aggregate data provided by a variety of client devices, rather than data provided by any one client device.

Figure 13:
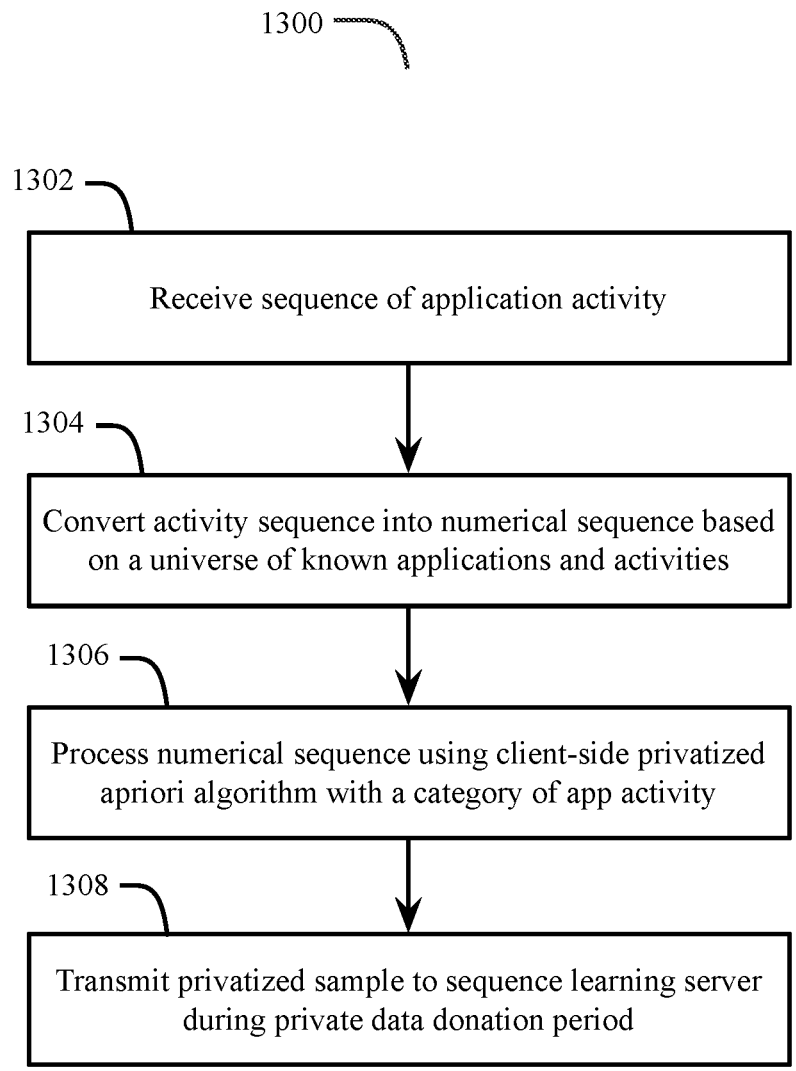
FIG. 13 illustrates a method to transmit a privatized subset of an application sequence, according to an embodiment.

FIG. 13 illustrates a method 1300 to transmit a privatized subset of an application sequence, according to an embodiment. Method 1300 can be performed by any of the client devices 110 described herein via the privacy engine 228. In one embodiment, applications 230A-230C executing on a client device 110 can use the privacy framework/API 227 to transmit private application activity data to the privacy engine 228. In one embodiment, some of the activity of the applications 230A-230C can be directly detected by the client device 110.

Method 1300 includes operation 1302 in which the privacy engine 228 can receive a sequence of application activity. The privacy engine 228 can perform operation 1304 to convert an activity sequence into a numerical sequence based upon a universe of known applications and activities. Specifically, the encoding between applications, activities and the numerical values of the numerical sequence is known by the client device 110 and the sequence learning server 130 or can be derived by the client device 110 and the sequence learning server 130.

Method 1300 additionally includes for the privacy engine 228 to perform operation 1306 to process the encoded numerical sequence using the privatized apriori algorithm described herein using a category of application activity. Method 1300 additionally includes for the privacy engine 228 to perform operation 1308 to transmit a privatized sample to the sequence learning server 130 during a private data donation period for the client device 110.

Figure 14A:
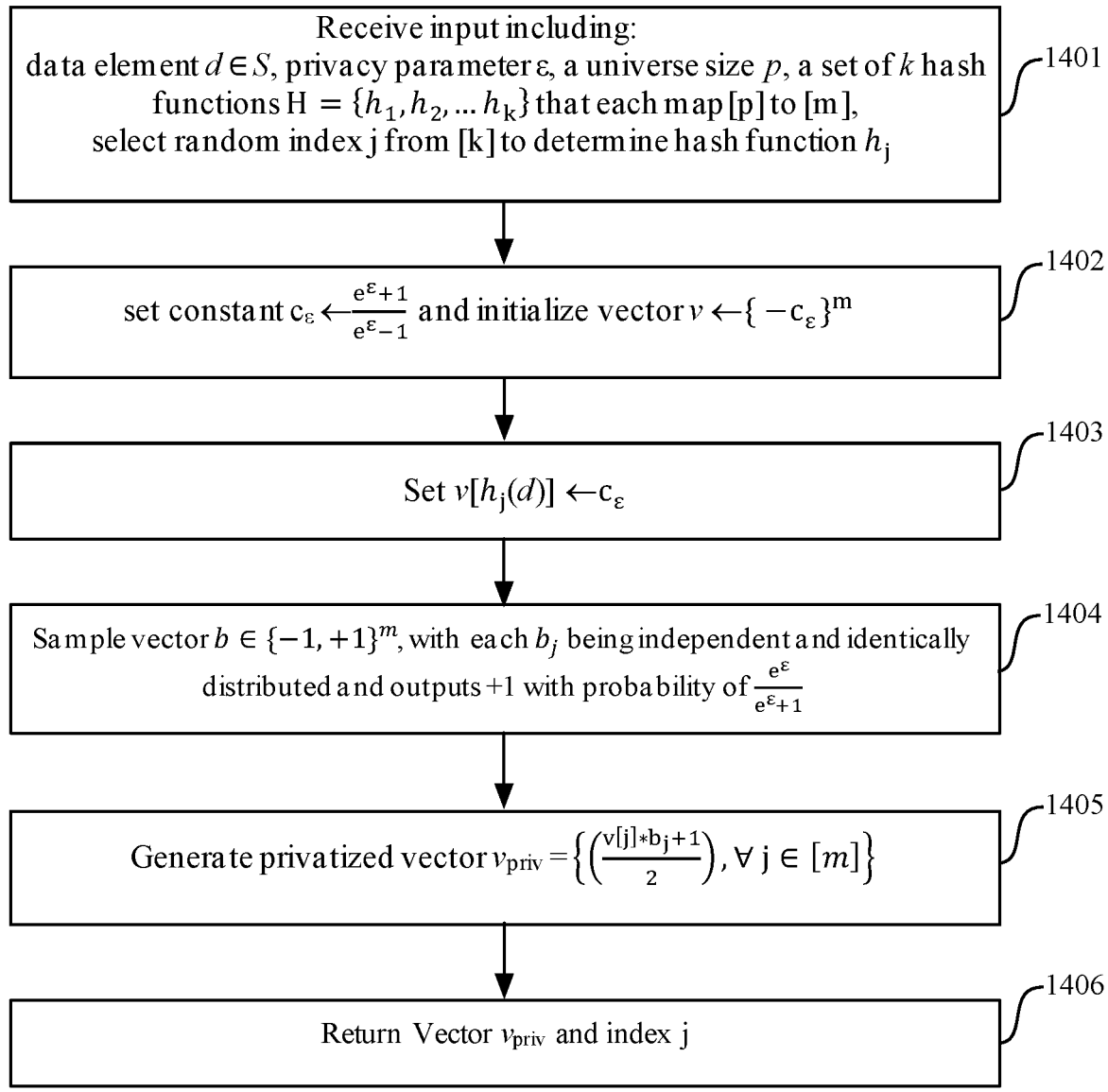
FIG. 14A-14B illustrate a client-side process and a server side-process for the count mean sketch differential privacy algorithm described herein.
Figure 14B:
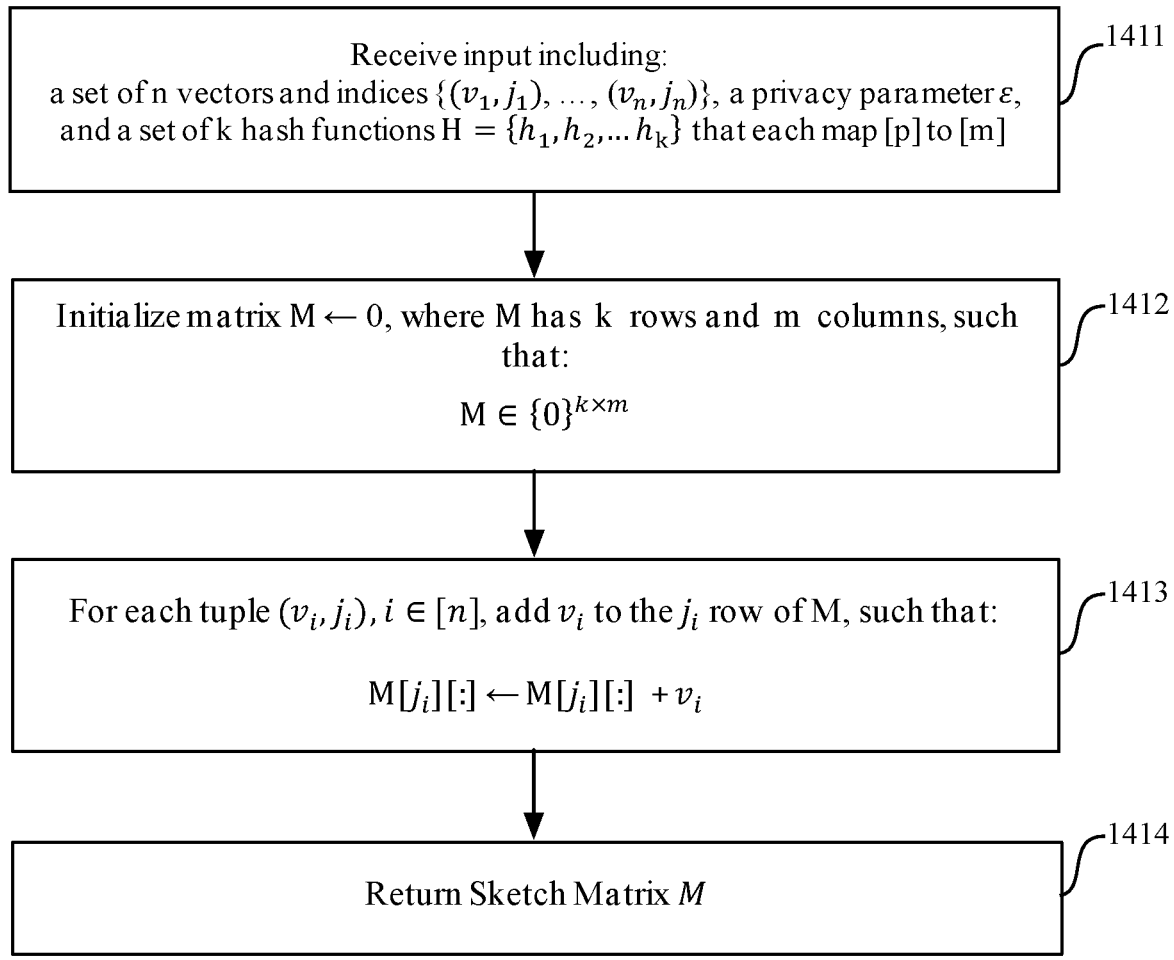

FIG. 14A-14B illustrate a client-side process 1400 and a server-side process 1410 for the count mean sketch differential privacy algorithm described herein. FIG. 14A shows an algorithmic representation of a client-side process 1400 of the count mean sketch differential privacy algorithm, according to an embodiment. FIG. 14B shows an algorithmic representation of a server-side process 1410 of the count mean sketch differential privacy algorithm, according to an embodiment. The count mean sketch algorithm can use hash functions to compress frequency data when the data to be privatized has a large universe of data. For example, the count mean sketch algorithm can be used to compress the data of matrix $A_1'x$ in a privacy preserving manner before the data is transmitted from a client device 110 to a sequence learning server 130.

As shown FIG. 14A, a client-side process 1400 can receive input including a data element $d \in S$, a privacy parameter $\varepsilon$, a universe size p, and a set of k hash functions $H=\{h_1, h_2, \ldots h_k\}$ that each map [p] to [m], can select random index j from [k] to determine hash function $h_j$, as shown at block 1401. Client-side process 1400 can then set a constant $$c_\varepsilon \leftarrow \frac{e^\varepsilon + 1}{e^\varepsilon - 1}$$

and initialize vector $v \leftarrow \{c_\varepsilon\}^m$, as shown in block 1402. Constant $c_\varepsilon$ allows noise added to maintain privacy and remain unbiased. Added noise should be large enough to mask individual items of user data, but small enough to allow any patterns in the dataset to appear.

As shown at block 1403 client-side process 1400 can use randomly selected hash function $h_j$ to set $v[h_j(d)] \leftarrow c_\varepsilon$. At block 1404, client-side process 1400 can sample vector $b \in \{-1, +1\}^m$, with each $b_j$ being independent and identically distributed and outputs +1 with probability $$\frac{e^\varepsilon}{e^\varepsilon + 1}.$$

As shown at block 1405, client-side process 1400 can then generate a privatized vector $$v_{priv} = \left\{ \left( \frac{v[j] * b_j + 1}{2} \right), \forall j \in [m] \right\}.$$

At block 1406, client-side process 1400 can return vector $v_{priv}$, which is a privatized version of vector v, and randomly selected index j.

As shown in FIG. 14B, a server-side process 1410 can aggregate client-side vectors and from client-side process 1400. Server-side process 1410 can receive input including a set of n vectors and indices $\{(v_1, j_1), \ldots, (v_n, j_n)\}$, a privacy parameter $\varepsilon$, and a set of k hash functions $H=\{h_1, h_2, \ldots h_k\}$ that each map [p] to [m], as shown at block 1411. Server-side process 1410 can then initialize matrix $M \leftarrow 0$, where M has k rows and m columns, such that $M \in \{0\}^{k \times m}$, as shown at block 1412. As shown at block 1413, for each tuple $(v_i, j_i)$, $i \in [n]$, server-side process 1410 can add $v_i$ to the $j_i$ row of M, such that $M[j_i][:] \leftarrow M[j_i][:] + v_i$. At block 1414, the server-side process 1410 can return sketch matrix M. Given the sketch matrix M, it is possible to estimate the count for entry $d \in S$ by de-biasing the counts and averaging over the corresponding hash entries in M.

While the count mean sketch differential privacy algorithm is described above as a privatization technique for the privatized apriori algorithm for sequential data discovery, embodiments are not limited to differential privacy algorithms for implementing privacy of the transmitted sequential labels. For example, homomorphic encryption techniques can be applied, such that encrypted values received from client devices can be summed on the server without revealing the privatized data to the server. In one embodiment the client devices can employ a homomorphic encryption algorithm to encrypt data to be transmitted to the sequence learning server 130. The server can then perform a homomorphic addition operation to sum the encrypted samples of data sequences. In one embodiment, secure multi-party computation techniques can also be applied, such that the client device and the server can jointly compute aggregated values for the data sequences without exposing user data directly to the sever.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 15:
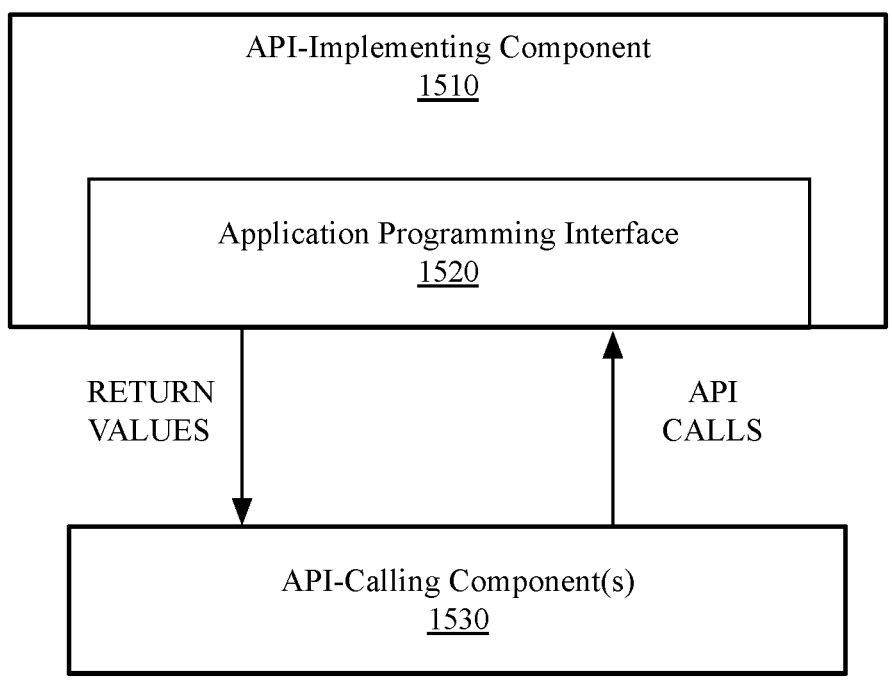
FIG. 15 is a block diagram illustrating an exemplary API architecture, which may be used in some embodiments of the invention.

FIG. 15 is a block diagram illustrating an exemplary API architecture, which may be used in some embodiments of the invention. As shown in FIG. 15, the API architecture 1500 includes the API-implementing component 1510 (e.g., an operating system, a library, a device driver, an API, an application program, software or other module) that implements the API 1520. The API 1520 specifies one or more functions, methods, classes, objects, protocols, data structures, formats and/or other features of the API-implementing component that may be used by the API-calling component 1530. The API 1520 can specify at least one calling convention that specifies how a function in the API-implementing component receives parameters from the API-calling component and how the function returns a result to the API-calling component. The API-calling component 1530 (e.g., an operating system, a library, a device driver, an API, an application program, software or other module), makes API calls through the API 1520 to access and use the features of the API-implementing component 1510 that are specified by the API 1520. The API-implementing component 1510 may return a value through the API 1520 to the API-calling component 1530 in response to an API call.

It will be appreciated that the API-implementing component 1510 may include additional functions, methods, classes, data structures, and/or other features that are not specified through the API 1520 and are not available to the API-calling component 1530. It should be understood that the API-calling component 1530 may be on the same system as the API-implementing component 1510 or may be located remotely and accesses the API-implementing component 1510 using the API 1520 over a network. While FIG. 15 illustrates a single API-calling component 1530 interacting with the API 1520, it should be understood that other API-calling components, which may be written in different languages (or the same language) than the API-calling component 1530, may use the API 1520.

The API-implementing component 1510, the API 1520, and the API-calling component 1530 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 16A:
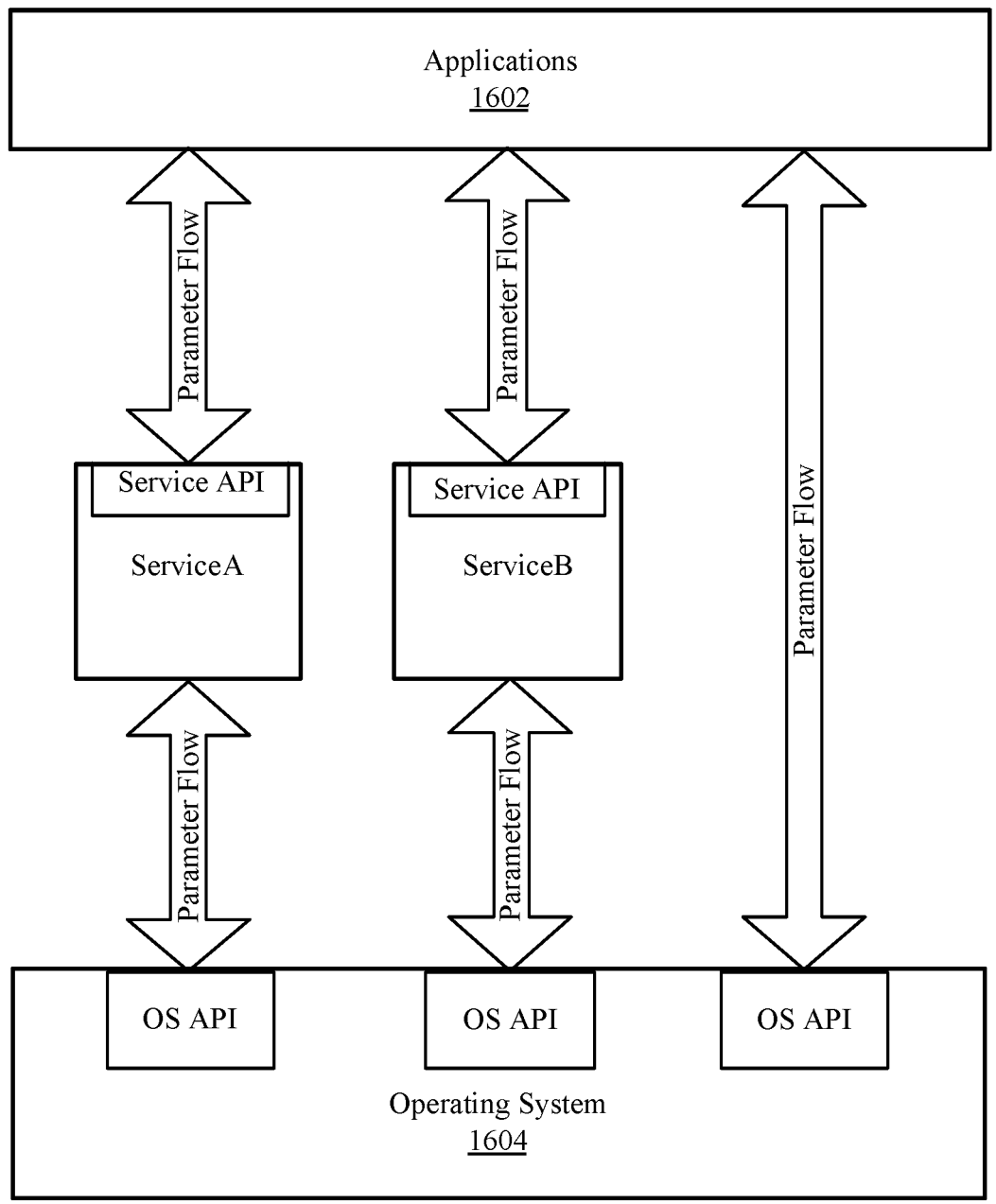
FIG. 16A-16B are block diagrams of exemplary API software stacks, according to embodiments.
Figure 16B:
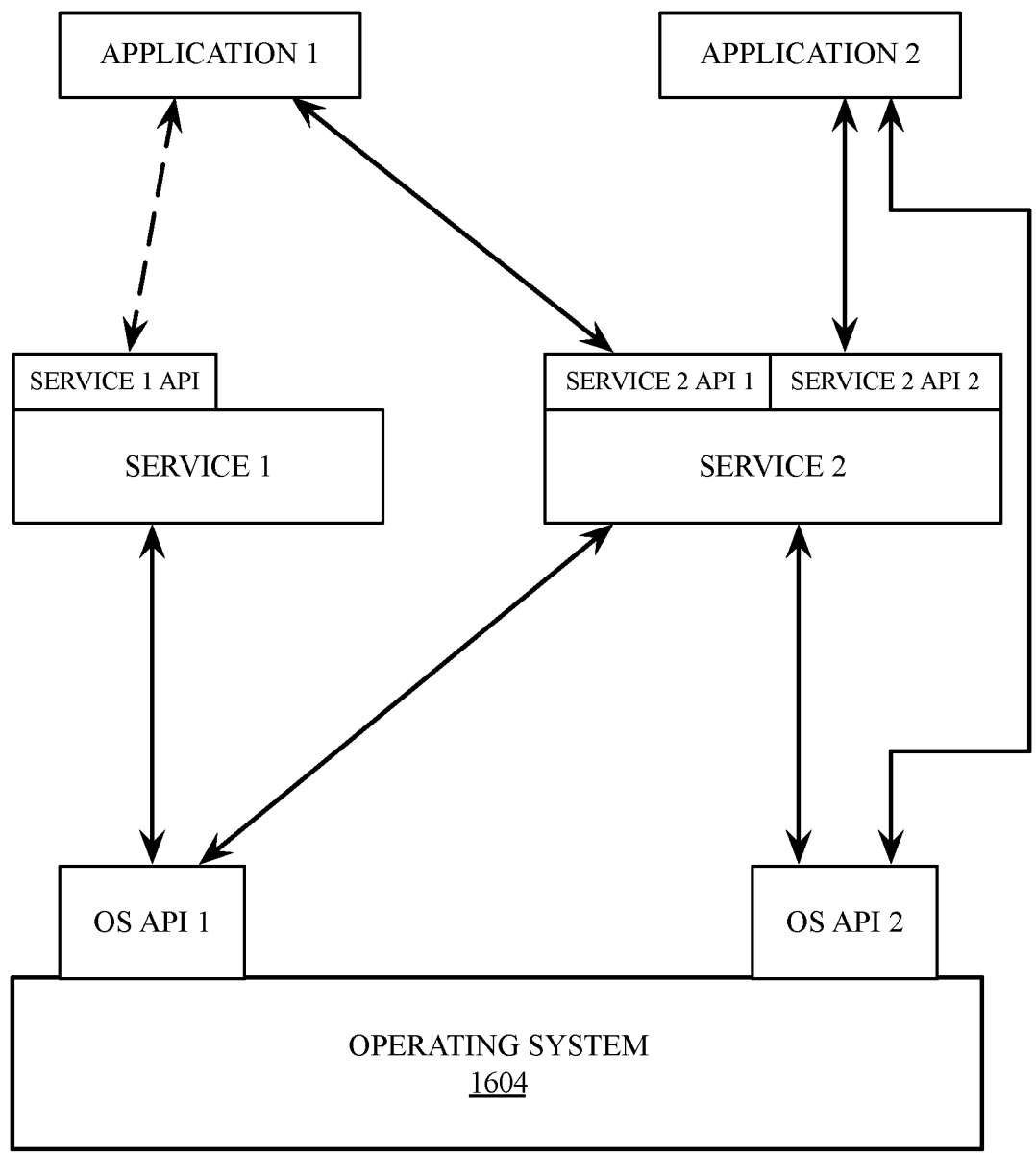

FIG. 16A-16B are block diagrams of exemplary API software stacks 1600, 1610, according to embodiments. FIG. 16A shows an exemplary API software stack 1600 in which applications 1602 can make calls to Service A or Service B using Service API and to Operating System 1604 using an OS API. Additionally, Service A and Service B can make calls to Operating System 1604 using several OS APIs.

FIG. 16B shows an exemplary software stack 1610 including Application 1, Application 2, Service 1, Service 2, and Operating System 1604. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 17:
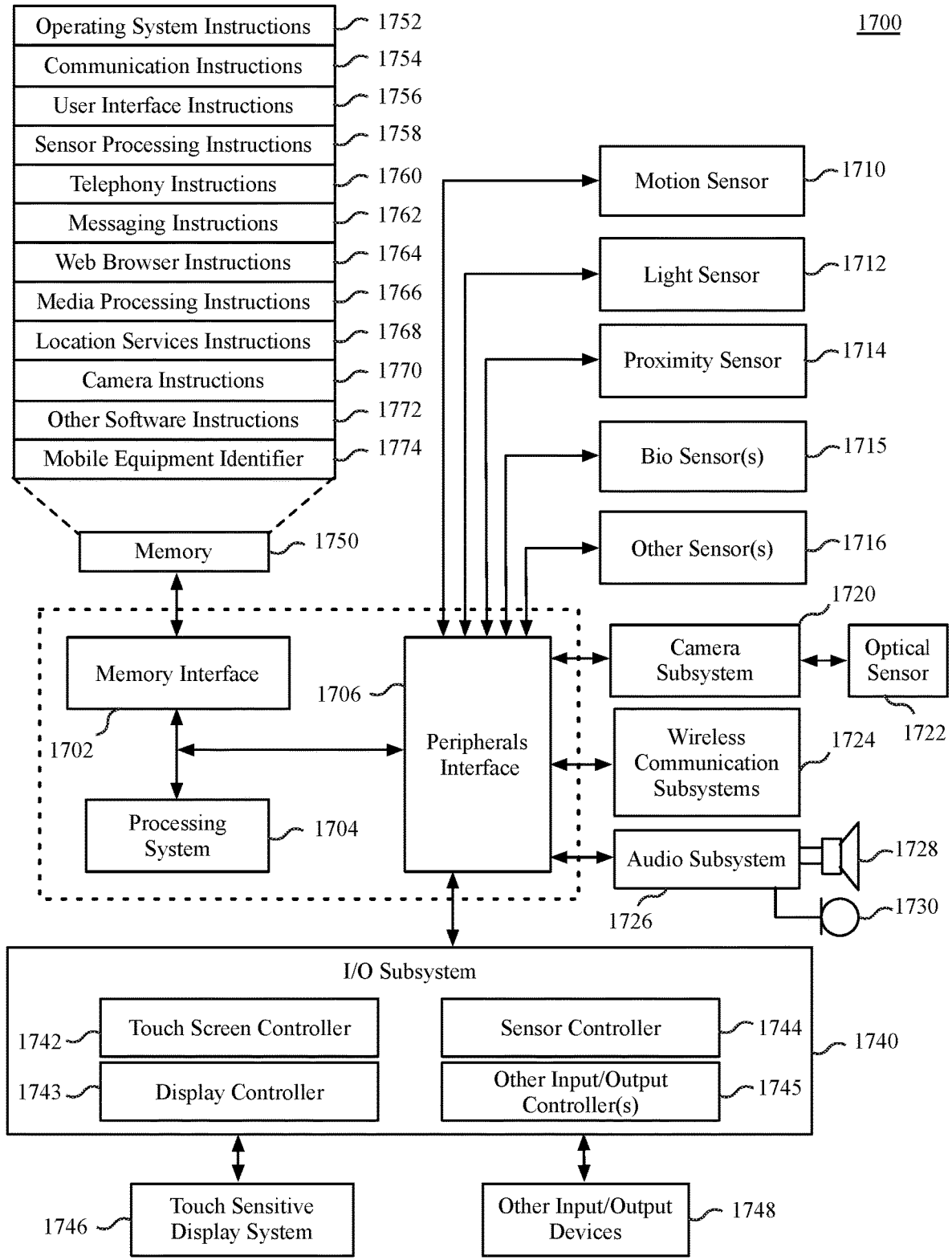
FIG. 17 is a block diagram of a device architecture for a mobile or embedded device, according to an embodiment.

FIG. 17 is a block diagram of a device architecture 1700 for a mobile or embedded device, according to an embodiment. The device architecture 1700 includes a memory interface 1702, a processing system 1704 including one or more data processors, image processors and/or graphics processing units, and a peripherals interface 1706. The various components can be coupled by one or more communication buses or signal lines. The various components can be separate logical components or devices or can be integrated in one or more integrated circuits, such as in a system on a chip integrated circuit.

The memory interface 1702 can be coupled to memory 1750, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1706 to facilitate multiple functionalities. For example, a motion sensor 1710, a light sensor 1712, and a proximity sensor 1714 can be coupled to the peripherals interface 1706 to facilitate the mobile device functionality. One or more biometric sensor(s) 1715 may also be present, such as a fingerprint scanner for fingerprint recognition or an image sensor for facial recognition. Other sensors 1716 can also be connected to the peripherals interface 1706, such as a positioning system (e.g., GPS receiver), a temperature sensor, or other sensing device, to facilitate related functionalities. A camera subsystem 1720 and an optical sensor 1722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1724, which can include radio frequency receivers and transmitters and/or optical (e.g., infrared) receivers and transmitters. The specific design and implementation of the wireless communication subsystems 1724 can depend on the communication network(s) over which a mobile device is intended to operate. For example, a mobile device including the illustrated device architecture 1700 can include wireless communication subsystems 1724 designed to operate over a GSM network, a CDMA network, an LTE network, a Wi-Fi network, a Bluetooth network, or any other wireless network. In particular, the wireless communication subsystems 1724 can provide a communications mechanism over which a media playback application can retrieve resources from a remote media server or scheduled events from a remote calendar or event server.

An audio subsystem 1726 can be coupled to a speaker 1728 and a microphone 1730 to facilitate voice-enabled functions, such as voice recognition, voice replication, digital recording, and telephony functions. In smart media devices described herein, the audio subsystem 1726 can be a high-quality audio system including support for virtual surround sound.

The I/O subsystem 1740 can include a touch screen controller 1742 and/or other input controller(s) 1745. For computing devices including a display device, the touch screen controller 1742 can be coupled to a touch sensitive display system 1746 (e.g., touch-screen). The touch sensitive display system 1746 and touch screen controller 1742 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1746. Display output for the touch sensitive display system 1746 can be generated by a display controller 1743. In one embodiment, the display controller 1743 can provide frame data to the touch sensitive display system 1746 at a variable frame rate.

In one embodiment, a sensor controller 1744 is included to monitor, control, and/or processes data received from one or more of the motion sensor 1710, light sensor 1712, proximity sensor 1714, or other sensors 1716. The sensor controller 1744 can include logic to interpret sensor data to determine the occurrence of one or more motion events or activities by analysis of the sensor data from the sensors.

In one embodiment, the I/O subsystem 1740 includes other input controller(s) 1745 that can be coupled to other input/control devices 1748, such as one or more buttons, rocker switches, thumb-wheel, infrared port, USB port, and/or a pointer device such as a stylus, or control devices such as an up/down button for volume control of the speaker 1728 and/or the microphone 1730.

In one embodiment, the memory 1750 coupled to the memory interface 1702 can store instructions for an operating system 1752, including portable operating system interface (POSIX) compliant and non-compliant operating system or an embedded operating system. The operating system 1752 may include instructions for handling basic system services and for performing hardware dependent tasks. In some implementations, the operating system 1752 can be a kernel.

The memory 1750 can also store communication instructions 1754 to facilitate communicating with one or more additional devices, one or more computers and/or one or more servers, for example, to retrieve web resources from remote web servers. The memory 1750 can also include user interface instructions 1756, including graphical user interface instructions to facilitate graphic user interface processing.

Additionally, the memory 1750 can store sensor processing instructions 1758 to facilitate sensor-related processing and functions; telephony instructions 1760 to facilitate telephone-related processes and functions; messaging instructions 1762 to facilitate electronic-messaging related processes and functions; web browser instructions 1764 to facilitate web browsing-related processes and functions; media processing instructions 1766 to facilitate media processing-related processes and functions; location services instructions including GPS and/or navigation instructions 1768 and Wi-Fi based location instructions to facilitate location based functionality; camera instructions 1770 to facilitate camera-related processes and functions; and/or other software instructions 1772 to facilitate other processes and functions, e.g., security processes and functions, and processes and functions related to the systems. The memory 1750 may also store other software instructions such as web video instructions to facilitate web video-related processes and functions; and/or web shopping instructions to facilitate web shopping-related processes and functions. In some implementations, the media processing instructions 1766 are divided into audio processing instructions and video processing instructions to facilitate audio processing-related processes and functions and video processing-related processes and functions, respectively. A mobile equipment identifier, such as an International Mobile Equipment Identity (MEI) 1774 or a similar hardware identifier can also be stored in memory 1750.

Each of the above identified instructions and applications can correspond to a set of instructions for performing one or more functions described above. These instructions need not be implemented as separate software programs, procedures, or modules. The memory 1750 can include additional instructions or fewer instructions. Furthermore, various functions may be implemented in hardware and/or in software, including in one or more signal processing and/or application specific integrated circuits.

Figure 18:
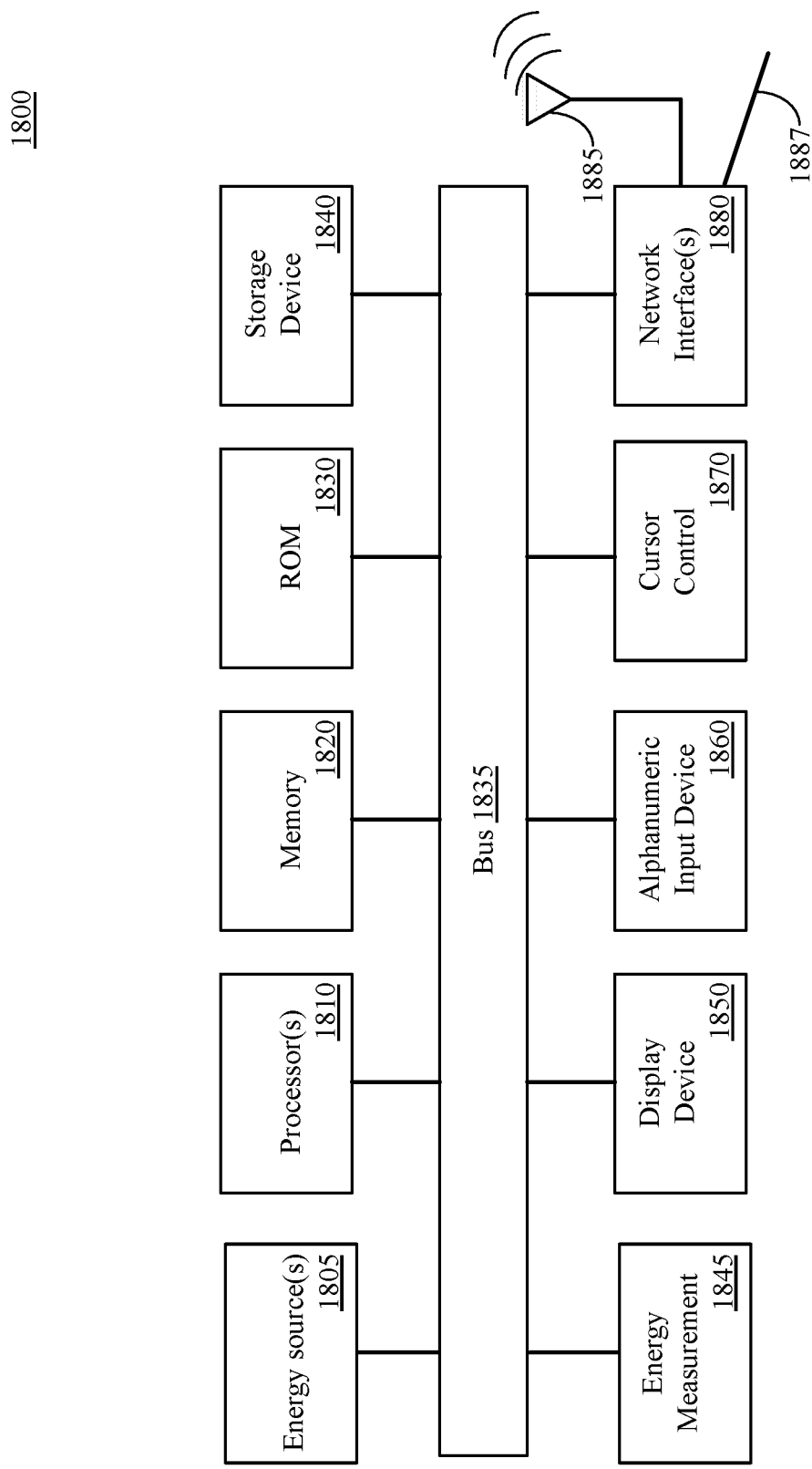
FIG. 18 is a block diagram of a computing system, according to an embodiment.

FIG. 18 is a block diagram of a computing system 1800, according to an embodiment. The illustrated computing system 1800 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1800 can be used to provide the computing device and/or a server device to which the computing device may connect.

The computing system 1800 includes bus 1835 or other communication device to communicate information, and processor(s) 1810 coupled to bus 1835 that may process information. While the computing system 1800 is illustrated with a single processor, the computing system 1800 may include multiple processors and/or co-processors. The computing system 1800 further may include random access memory 1820 (RAM) or other dynamic storage device coupled to the bus 1835. The memory 1820 may store information and instructions that may be executed by processor(s) 1810. Main memory 1820 may also be used to store temporary variables or other intermediate information during execution of instructions by the processor(s) 1810.

The computing system 1800 may also include read only memory (ROM) 1830 and/or another data storage device 1840 coupled to the bus 1835 that may store information and instructions for the processor(s) 1810. The data storage device 1840 can be or include a variety of storage devices, such as a flash memory device, a magnetic disk, or an optical disc and may be coupled to computing system 1800 via the bus 1835 or via a remote peripheral interface.

The computing system 1800 may also be coupled, via the bus 1835, to a display device 1850 to display information to a user. The computing system 1800 can also include an alphanumeric input device 1860, including alphanumeric and other keys, which may be coupled to bus 1835 to communicate information and command selections to processor(s) 1810. Another type of user input device includes a cursor control 1870 device, such as a touchpad, a mouse, a trackball, or cursor direction keys to communicate direction information and command selections to processor(s) 1810 and to control cursor movement on the display device 1850. The computing system 1800 may also receive user input from a remote device that is communicatively coupled via one or more network interface(s) 1880.

The computing system 1800 further may include one or more network interface(s) 1880 to provide access to a network, such as a local area network. The network interface(s) 1880 may include, for example, a wireless network interface having antenna 1885, which may represent one or more antenna(e). The computing system 1800 can include multiple wireless network interfaces such as a combination of Wi-Fi, Bluetooth®, near field communication (NFC), and/or cellular telephony interfaces. The network interface(s) 1880 may also include, for example, a wired network interface to communicate with remote devices via network cable 1887, which may be, for example, an Ethernet cable, a coaxial cable, a fiber optic cable, a serial cable, or a parallel cable.

In one embodiment, the network interface(s) 1880 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1880 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1800 can further include one or more energy sources 1805 and one or more energy measurement systems 1845. Energy sources 1805 can include an AC/DC adapter coupled to an external power source, one or more batteries, one or more charge storage devices, a USB charger, or other energy source. Energy measurement systems include at least one voltage or amperage measuring device that can measure energy consumed by the computing system 1800 during a predetermined period of time. Additionally, one or more energy measurement systems can be included that measure, e.g., energy consumed by a display device, cooling subsystem, Wi-Fi subsystem, or other frequently used or high-energy consumption subsystem.

It should be noted that the term "approximately" or "substantially" may be used herein and may be interpreted as "as nearly as practicable," "within technical limitations," and the like. In addition, the use of the term "or" indicates an inclusive or (e.g. and/or) unless otherwise specified.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

As described above, one aspect of the present technology is the gathering and use of data available from various sources to enable crowdsource learning of sequential data. The present disclosure contemplates that in some instances, this gathered data may include personal information data that uniquely identifies or can be used to contact or locate a specific person. Such personal information data can include demographic data, location-based data, telephone numbers, email addresses, social media IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to learn new words, improve keyboard layouts, improve auto-correct engines for keyboards, and to enable an electronic device to better anticipate the needs of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, crowdsourcing of sequences is performed over a large number of users and is based on aggregated data. A large number of individual users can opt out of sending data to the sequence learning server and overall trends can still be detected.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A method implemented on a client computing device, the method comprising:
   receiving a data sequence and a category from an application, wherein the category is a type of sequence represented by the data sequence, the category selected from a set of categories including an autocorrect data tuple or a device activity sequence, wherein the autocorrect data tuple includes a typed word, an autocorrected word, and a revision of the autocorrected word and the device activity sequence includes an application launch sequence or an application activity sequence;
   encoding the data sequence into an input vector, wherein the encoding for the data sequence is determined based on the category;
   selecting an index from a set of indices, a size of the set of indices associated with a length of the input vector;
   generating a projected vector based on the input vector and a matrix in a set of known matrices, the set of known matrices stored on the client computing device and a sequence learning server, wherein each matrix in the set of known matrices is associated with an index and the projected vector is generated using the matrix associated with a selected index;
   generating a privatized encoding of the projected vector; and
   transmitting the privatized encoding, the category, and the selected index to the sequence learning server, wherein the sequence learning server learns the data sequence in a privacy preserving manner based on aggregate data received from multiple client computing devices.

2. The method as in claim 1, wherein the index is selected uniformly and at random from the set of indices.

3. The method as in claim 1, wherein the set of categories additionally includes a word sequence.

4. The method as in claim 3, wherein the application activity sequence and the application activity sequence includes a sequence of activities performed within an application.

5. The method as in claim 3, additionally comprising receiving an updated dictionary including a word learned by the sequence learning server.

6. A data processing system on a client computing device, the data processing system comprising:
   a memory to store instructions; and
   one or more processors to execute the instructions to cause the one or more processors to:
      receive a data sequence and a category from an application, wherein the category is a type of sequence represented by the data sequence, the category selected from a set of categories including an autocorrect data tuple or a device activity sequence, wherein the autocorrect data tuple includes a typed word, an autocorrected word, and a revision of the autocorrected word and the device activity sequence includes an application launch sequence or an application activity sequence;

encode the data sequence into an input vector, wherein an encoding for the data sequence is determined based on the category;

select an index uniformly and at random from a set of indices, a size of the set of indices associated with a length of the input vector;

generate a projected vector based on the input vector and a matrix in a set of known matrices, the set of known matrices to be stored on the client computing device and a sequence learning server, wherein each matrix in the set of known matrices is to be associated with an index and the projected vector is to be generated using the matrix associated with a selected index;

generate a privatized encoding of the projected vector; and transmit the privatized encoding, the category, and the selected index to the sequence learning server, wherein the sequence learning server is to learn the data sequence in a privacy preserving manner based on aggregate data received from multiple client computing devices.

7. The data processing system as in claim 6, the set of categories additionally includes a word sequence.

8. The data processing system as in claim 7, wherein additionally comprising receiving an updated dictionary including a word learned by the sequence learning server.

9. The data processing system as in claim 7, wherein the application activity sequence includes a sequence of activities performed within an application.

10. A non-transitory machine-readable medium storing instructions which, when executed by one or more processors of a client computing device, cause the client computing device to perform operations comprising:

receiving a data sequence and a category from an application, wherein the category is a type of sequence represented by the data sequence, the category selected from a set of categories including an autocorrect data tuple or a device activity sequence, wherein the autocorrect data tuple includes a typed word, an autocorrected word, and a revision of the autocorrected word and the device activity sequence includes an application launch sequence or an application activity sequence;

encoding the data sequence into an input vector, wherein the encoding for the data sequence is determined based on the category;

selecting an index from a set of indices, a size of the set of indices associated with a length of the input vector;

generating a projected vector based on the input vector and a matrix in a set of known matrices, the set of known matrices stored on the client computing device and a sequence learning server, wherein each matrix in the set of known matrices is associated with an index and the projected vector is generated using the matrix associated with a selected index;

generating a privatized encoding of the projected vector; and transmitting the privatized encoding, the category, and the selected index to the sequence learning server, wherein the sequence learning server learns the data sequence in a privacy preserving manner based on aggregate data received from multiple client computing devices.

11. The non-transitory machine-readable medium as in claim 10, wherein the index is selected uniformly and at random from the set of indices.

12. The non-transitory machine-readable medium as in claim 10, wherein the set of categories additionally includes a word sequence.

13. The non-transitory machine-readable medium as in claim 12, wherein the device activity sequence includes an application activity sequence and the application activity sequence includes a sequence of activities performed within an application.

14. The non-transitory machine-readable medium as in claim 12, the operations additionally comprising receiving an updated dictionary including a word learned by the sequence learning server.

* * * * *

UNITED STATES PATENT AND TRADEMARK OFFICE
CERTIFICATE OF CORRECTION

PATENT NO. : 11,055,492 B2
APPLICATION NO. : 16/271702
DATED : July 6, 2021
INVENTOR(S) : Abhishek Bhowmick et al.

Page 1 of 1

It is certified that error appears in the above-identified patent and that said Letters Patent is hereby corrected as shown below:

In the Claims

Claim 4, Column 24, Lines 53-54 delete "the application activity sequence and the application activity sequence" and insert --the application activity sequence--.

Signed and Sealed this
Tenth Day of August, 2021

Drew Hirshfeld
*Performing the Functions and Duties of the
Under Secretary of Commerce for Intellectual Property and
Director of the United States Patent and Trademark Office*